United States Patent
LaCross et al.

(10) Patent No.: US 11,702,010 B2
(45) Date of Patent: Jul. 18, 2023

(54) INTERIOR REARVIEW MIRROR ASSEMBLY WITH DISPLAY AND TILT MECHANISM

(71) Applicant: Magna Mirrors of America, Inc., Holland, MI (US)

(72) Inventors: Anthony J. LaCross, Hastings, MI (US); Gregory A. Huizen, Hudsonville, MI (US); Eric Peterson, West Olive, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 3 days.

(21) Appl. No.: 17/646,682

(22) Filed: Dec. 31, 2021

(65) Prior Publication Data

US 2022/0161727 A1 May 26, 2022

Related U.S. Application Data

(63) Continuation of application No. 16/946,027, filed on Jun. 3, 2020, now Pat. No. 11,214,199.

(60) Provisional application No. 62/945,262, filed on Dec. 9, 2019, provisional application No. 62/856,319, filed on Jun. 3, 2019.

(51) Int. Cl.
| | |
|---|---|
| *B60R 1/12* | (2006.01) |
| *H04N 5/655* | (2006.01) |
| *B60R 1/04* | (2006.01) |

(52) U.S. Cl.
CPC ............... *B60R 1/12* (2013.01); *B60R 1/04* (2013.01); *H04N 5/655* (2013.01); *B60R 2001/1215* (2013.01); *B60R 2001/1253* (2013.01); *B60R 2300/10* (2013.01); *B60R 2300/20* (2013.01)

(58) Field of Classification Search
CPC ..... B60R 1/04; B60R 1/12; B60R 2001/1215; B60R 2001/1253; B60R 2300/207; B60R 2300/20; B60R 2300/10; B60R 1/088; B60R 1/02; B60R 2300/205; B60R 2300/00; B60R 2300/50; B60R 1/07; B60R 1/072; B60R 1/074; B60R 1/085
USPC ........................................................ 348/148
See application file for complete search history.

(56) References Cited

U.S. PATENT DOCUMENTS

| | | | |
|---|---|---|---|
| 2,263,382 | A | 11/1941 | Gotzinger |
| 2,580,014 | A | 12/1951 | Gazda |
| 3,266,016 | A | 8/1966 | Maru |
| 4,499,451 | A | 2/1985 | Suzuki et al. |
| 4,588,267 | A | 5/1986 | Pastore |

(Continued)

*Primary Examiner* — Nathnael Aynalem
(74) *Attorney, Agent, or Firm* — Honigman LLP

(57) ABSTRACT

A vehicular interior rearview mirror assembly includes a mirror head and a display device disposed in the mirror head and behind a reflective element. An actuator is operable to adjust the mirror head between a mirror mode orientation and a display mode orientation. Operation of the actuator moves a cam follower to cause a pin at the mirror head to travel along the groove to adjust orientation of the mirror head. With the mirror head in the mirror mode orientation, a first voltage is applied to adjust the mirror head out of the mirror mode orientation. A second voltage that is lower than the first voltage is then applied to adjust the mirror head toward the display mode orientation. A third voltage that is higher than the second voltage is then applied to adjust the mirror head into the display mode orientation.

36 Claims, 16 Drawing Sheets

(56) References Cited

U.S. PATENT DOCUMENTS

| | | |
|---|---|---|
| 4,623,222 A | 11/1986 | Itoh et al. |
| 4,630,904 A | 12/1986 | Pastore |
| 4,712,879 A | 12/1987 | Lynam et al. |
| 4,721,364 A | 1/1988 | Itoh et al. |
| 4,906,085 A | 3/1990 | Sugihara et al. |
| 5,073,012 A | 12/1991 | Lynam |
| 5,076,673 A | 12/1991 | Lynam et al. |
| 5,117,346 A | 5/1992 | Gard |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,253,109 A | 10/1993 | O'Farrell et al. |
| 5,313,335 A | 5/1994 | Gray et al. |
| 5,355,284 A | 10/1994 | Roberts |
| 5,406,414 A | 4/1995 | O'Farrell et al. |
| 5,436,741 A | 7/1995 | Crandall |
| 5,481,409 A | 1/1996 | Roberts |
| 5,525,264 A | 6/1996 | Cronin et al. |
| 5,530,240 A | 6/1996 | Larson et al. |
| 5,567,360 A | 10/1996 | Varaprasad et al. |
| 5,575,552 A | 11/1996 | Faloon et al. |
| 5,587,699 A | 12/1996 | Faloon et al. |
| 5,610,756 A | 3/1997 | Lynam et al. |
| 5,668,663 A | 9/1997 | Varaprasad et al. |
| 5,724,187 A | 3/1998 | Varaprasad et al. |
| 5,786,772 A | 7/1998 | Schofield et al. |
| 5,788,357 A | 8/1998 | Muth et al. |
| 5,910,854 A | 6/1999 | Varaprasad et al. |
| 5,938,166 A | 8/1999 | Seichter et al. |
| 5,938,320 A | 8/1999 | Crandall |
| 5,956,181 A | 9/1999 | Lin |
| 6,002,544 A | 12/1999 | Yatsu |
| 6,005,724 A | 12/1999 | Todd |
| 6,045,243 A | 4/2000 | Muth et al. |
| 6,111,683 A | 8/2000 | Cammenga et al. |
| 6,154,306 A | 11/2000 | Varaprasad et al. |
| 6,178,034 B1 | 1/2001 | Allemand et al. |
| 6,257,746 B1 | 7/2001 | Todd et al. |
| 6,264,353 B1 | 7/2001 | Caraher et al. |
| 6,329,925 B1 | 12/2001 | Skiver et al. |
| 6,356,376 B1 | 3/2002 | Tonar et al. |
| 6,428,172 B1 | 8/2002 | Hutzel et al. |
| 6,512,624 B2 | 1/2003 | Tonar et al. |
| 6,642,840 B2 | 11/2003 | Lang et al. |
| 6,690,268 B2 | 2/2004 | Schofield et al. |
| 6,700,692 B2 | 3/2004 | Tonar et al. |
| 7,184,190 B2 | 2/2007 | McCabe et al. |
| 7,195,381 B2 | 3/2007 | Lynam et al. |
| 7,224,324 B2 | 5/2007 | Quist et al. |
| 7,253,723 B2 | 8/2007 | Lindahl et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,338,177 B2 | 3/2008 | Lynam |
| 7,360,932 B2 | 4/2008 | Uken et al. |
| 7,370,983 B2 | 5/2008 | DeWind et al. |
| 7,446,650 B2 | 11/2008 | Scholfield et al. |
| 7,446,924 B2 | 11/2008 | Schofield et al. |
| 7,488,080 B2 | 2/2009 | Skiver et al. |
| 7,581,859 B2 | 9/2009 | Lynam |
| 7,626,749 B2 | 12/2009 | Baur et al. |
| 7,777,611 B2 | 8/2010 | Desai |
| 7,855,755 B2 | 12/2010 | Weller et al. |
| 8,049,640 B2 | 11/2011 | Uken et al. |
| 8,154,418 B2 | 4/2012 | Peterson et al. |
| 8,277,059 B2 | 10/2012 | McCabe et al. |
| 8,508,831 B2 | 8/2013 | De Wind et al. |
| 8,529,108 B2 | 9/2013 | Uken et al. |
| 8,730,553 B2 | 5/2014 | De Wind et al. |
| 8,960,629 B2 | 2/2015 | Rizk et al. |
| 9,174,578 B2 | 11/2015 | Uken et al. |
| 9,346,403 B2 | 5/2016 | Uken et al. |
| 9,575,315 B2 * | 2/2017 | Lee ................. G02F 1/1533 |
| 9,598,016 B2 | 3/2017 | Blank et al. |
| 9,827,913 B2 | 11/2017 | De Wind et al. |
| 9,878,669 B2 | 1/2018 | Kendall |
| 10,029,615 B2 * | 7/2018 | Hallack ................... B60R 1/12 |
| 10,046,706 B2 | 8/2018 | Larson et al. |
| 10,166,924 B2 | 1/2019 | Baur |
| 10,300,858 B2 * | 5/2019 | Roth ........................ B60R 1/04 |
| 10,421,404 B2 | 9/2019 | Larson et al. |
| 10,442,360 B2 * | 10/2019 | LaCross .................. B60R 1/04 |
| 10,466,563 B2 | 11/2019 | Kendall et al. |
| 11,214,199 B2 | 1/2022 | LaCross et al. |
| 2004/0027694 A1 | 2/2004 | Lin |
| 2004/0027695 A1 | 2/2004 | Lin |
| 2006/0050018 A1 | 3/2006 | Hutzel et al. |
| 2006/0268561 A1 * | 11/2006 | DeLine ............. B60Q 1/2665 362/140 |
| 2008/0073477 A1 | 3/2008 | Lang et al. |
| 2012/0038964 A1 | 2/2012 | De Wind et al. |
| 2012/0236388 A1 | 9/2012 | De Wind et al. |
| 2014/0022390 A1 | 1/2014 | Blank et al. |
| 2014/0097320 A1 | 4/2014 | Rizk et al. |
| 2014/0268355 A1 | 9/2014 | Lee et al. |
| 2014/0285666 A1 | 9/2014 | O'Connell et al. |
| 2014/0293169 A1 | 10/2014 | Uken et al. |
| 2015/0085337 A1 | 3/2015 | Lee et al. |
| 2015/0097955 A1 | 4/2015 | De Wind et al. |
| 2016/0082890 A1 | 3/2016 | Habibi et al. |
| 2016/0129842 A1 | 5/2016 | Kuester |
| 2016/0250970 A1 | 9/2016 | Kuester et al. |
| 2016/0250972 A1 | 9/2016 | Kuester et al. |
| 2016/0250974 A1 | 9/2016 | Kuester et al. |
| 2016/0275833 A1 | 9/2016 | Forbes et al. |
| 2016/0341963 A1 | 11/2016 | Minikey, Jr. et al. |
| 2017/0080867 A1 * | 3/2017 | Hallack ................... B60R 1/04 |
| 2017/0088055 A1 | 3/2017 | Cammenga et al. |
| 2017/0248787 A1 | 8/2017 | Lee et al. |
| 2017/0297498 A1 | 10/2017 | Larson et al. |
| 2017/0327044 A1 | 11/2017 | Baur |
| 2017/0355312 A1 | 12/2017 | Habibi et al. |
| 2018/0134217 A1 | 5/2018 | Peterson et al. |
| 2018/0244204 A1 | 8/2018 | Boehm |
| 2018/0251069 A1 | 9/2018 | LaCross et al. |
| 2018/0329210 A1 | 11/2018 | Lee et al. |
| 2019/0118717 A1 | 4/2019 | Blank et al. |
| 2019/0146297 A1 | 5/2019 | Lynam et al. |
| 2019/0258131 A9 | 8/2019 | Lynam et al. |
| 2021/0155167 A1 | 5/2021 | Lynam et al. |
| 2021/0162926 A1 | 6/2021 | Lu |
| 2021/0245662 A1 | 8/2021 | Blank et al. |

\* cited by examiner

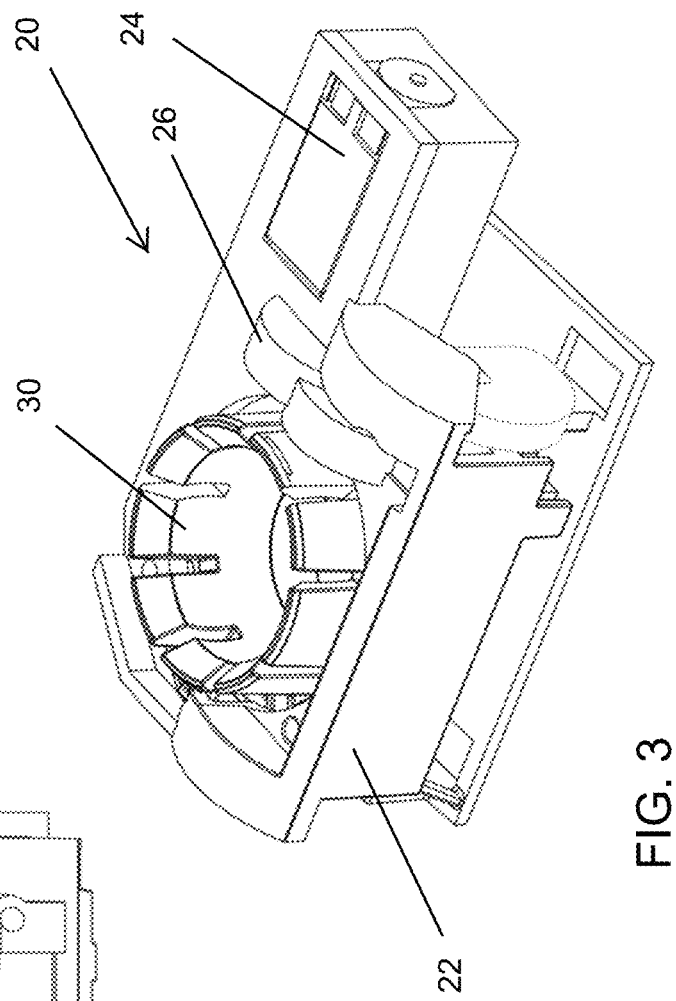
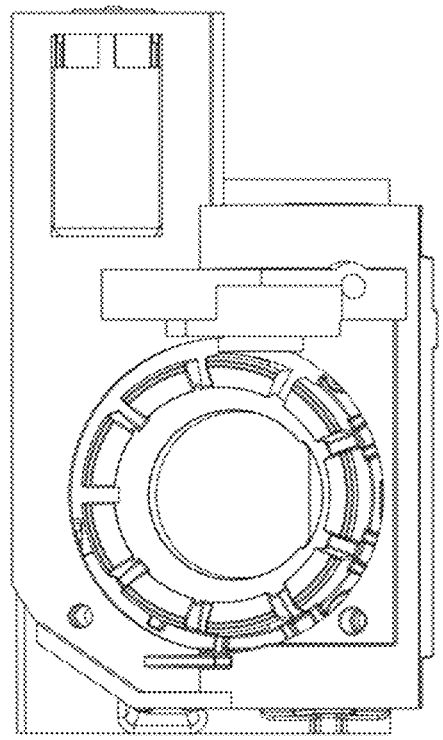
FIG. 3
FIG. 4

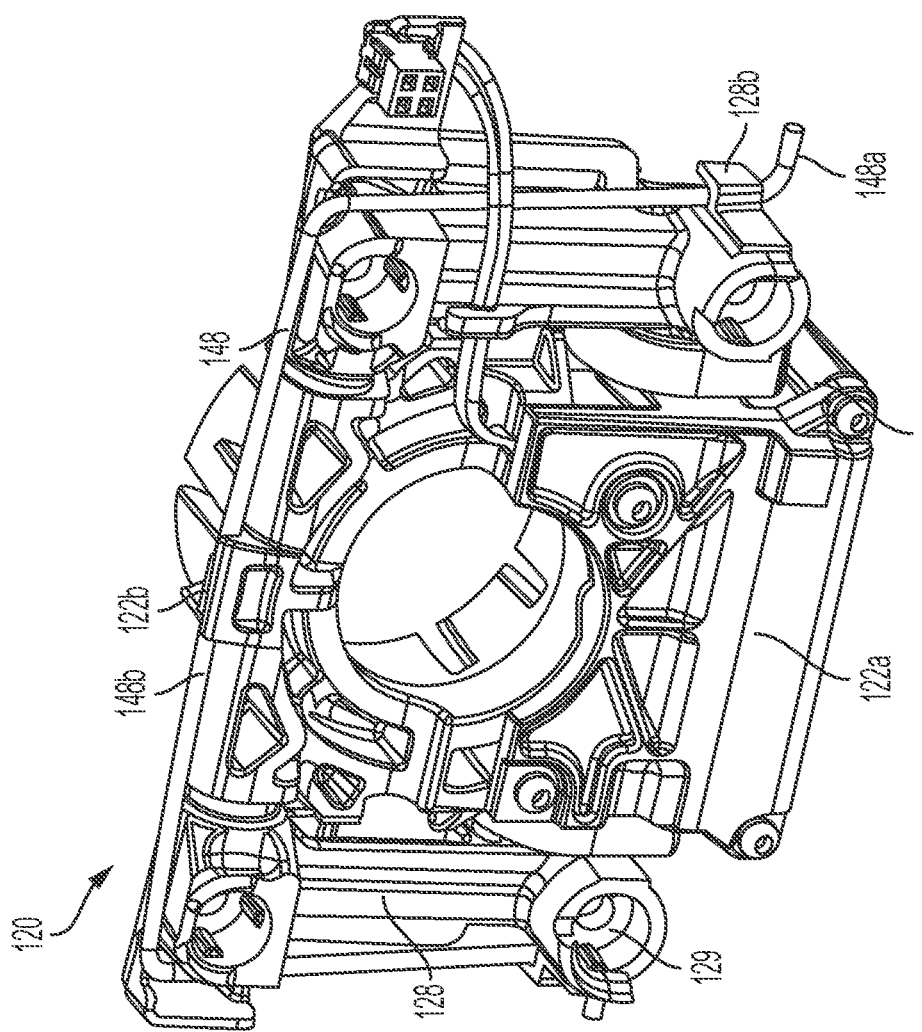

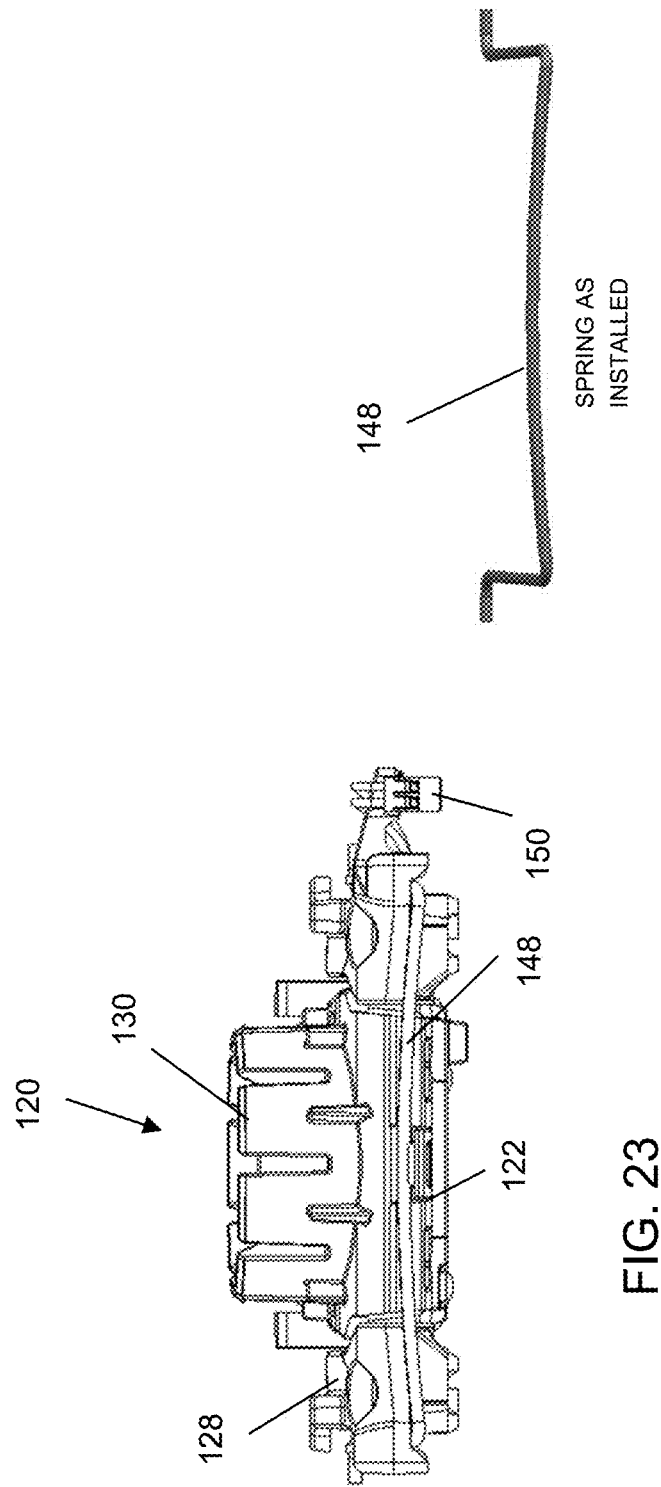

INTERIOR REARVIEW MIRROR ASSEMBLY WITH DISPLAY AND TILT MECHANISM

CROSS REFERENCE TO RELATED APPLICATIONS

The present application is a continuation of U.S. patent application Ser. No. 16/946,027, filed Jun. 3, 2020, now U.S. Pat. No. 11,214,199, which claims priority of U.S. provisional application Ser. No. 62/945,262, filed Dec. 9, 2019, and U.S. provisional application Ser. No. 62/856,319, filed Jun. 3, 2019, which are hereby incorporated herein by reference in their entireties.

FIELD OF THE INVENTION

The present invention relates to interior rearview mirror systems and, more particularly, to an interior rearview mirror system having a display at the interior rearview mirror for viewing by the driver of the vehicle.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element. It is also generally known to provide a display screen at the mirror assembly. A variety of interior and exterior mirror assemblies with indicators and/or displays are known in the art, such as U.S. Pat. Nos. 5,668,663; 5,355,284; 5,788,357; 6,257,746; 6,005,724; 5,481,409; 6,111,683; 6,045,243; 6,264,353; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,436,741; 5,587,699; 5,938,320; 6,700,692 and 5,786,772, which are all hereby incorporated herein by reference in their entireties.

SUMMARY OF THE INVENTION

The present invention provides a vision system for displaying video images of captured images for viewing by the driver of the vehicle. A video display screen is disposed in the vehicle cabin and is viewable at the interior rearview mirror assembly. The mirror head and reflective element of the mirror assembly can be adjusted or flipped between a mirror mode orientation, where the driver of the vehicle views rearward of the vehicle via the mirror reflective element, and a display mode orientation, where the driver of the vehicle views images displayed by the display device via the mirror reflective element. The adjustment or flipping function is performed by an actuator of the mirror head that operates to pivot the mirror head relative to the pivot joint attachment that attaches the mirror head to a mirror mount affixed at an interior portion of the vehicle (such as at a headliner or at an in-cabin surface of the vehicle windshield or the like). The actuator is actuated via a user input or may automatically actuate to pivot the mirror head to a display orientation responsive to the driver shifting the vehicle transmission into a reverse gear (whereby the display screen may be activated to display video images derived from image data captured by a rear backup camera of the vehicle).

These and other objects, advantages, purposes and features of the present invention will become apparent upon review of the following specification in conjunction with the drawings.

BRIEF DESCRIPTION OF THE DRAWINGS

FIG. 3 is a perspective view of the actuator;

FIG. 4 is a plan view of the actuator;

FIGS. 17-19 are perspective views of another actuator that pivots the mirror head between the display mode orientation and the mirror mode orientation;

FIG. 23 is a top view of the actuator;

FIG. 24 is a perspective view of a spring element of the actuator;

DESCRIPTION OF THE PREFERRED EMBODIMENTS

Figure 1:
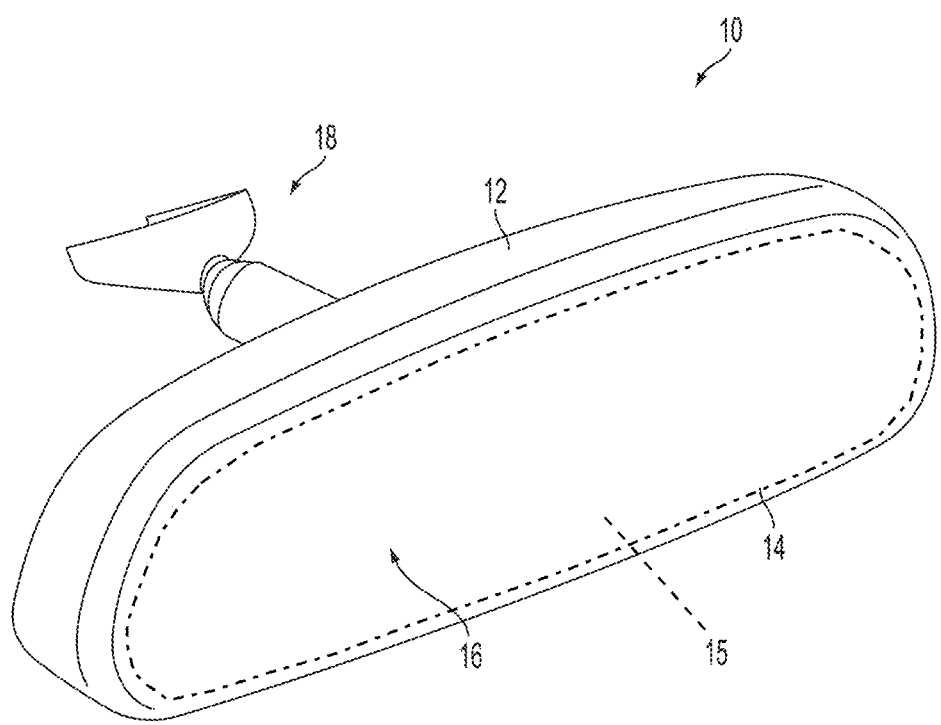
FIG. 1 is a perspective view of an interior rearview mirror assembly suitable for use with the display system of the present invention.
Figure 2:
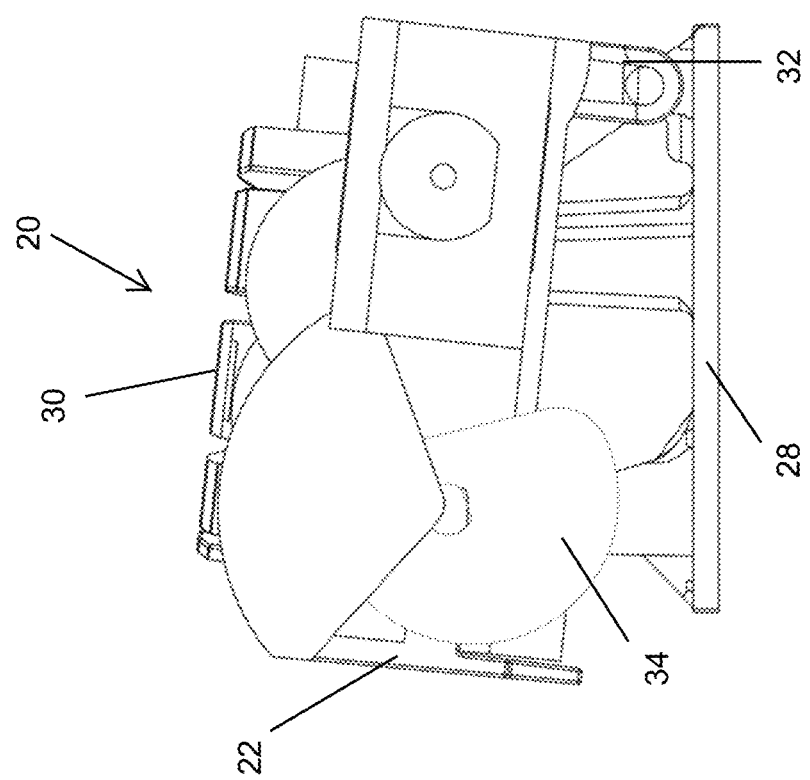
FIG. 2 is a side elevation of an actuator operable to pivot the mirror head of the mirror assembly between a display mode orientation and a mirror mode orientation in accordance with the present invention.

Referring now to the drawings and the illustrative embodiments depicted therein, an interior rearview mirror assembly 10 for a vehicle includes a casing 12 that houses a reflective element 14 and a display device, which provides a display area 16 visible to the driver of the vehicle through the reflective element 14 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 18. The casing 12 of the interior rearview mirror assembly 10 may house all or a portion of the components of the interior rearview mirror assembly 10 and may be integrally formed with portions thereof.

The mirror head is tiltable or pivotable between a mirror mode orientation, where the reflective element is positioned to provide the desired driver's rearward field of view, and a display mode orientation, where the mirror head is tilted upward or downward relative to the mirror mode orientation, such that the display is viewable by the driver while the reflective element reflects light from rearward of the vehicle and incident thereon upward or downward away from the driver's eyes. The mirror reflective element comprises a transflective mirror reflector disposed at a surface of a glass substrate of the mirror reflective element (such as at the rear surface of a prismatic glass substrate of a prismatic mirror reflective element, or such as at the front or rear surface of a rear glass substrate of an electro-optic, such as electrochromic, mirror reflective element). The transflective mirror reflector is partially reflective of visible light incident thereat and partially transmissive of visible light. When the mirror reflective element is at the mirror mode orientation, visible light incident at the mirror reflective element is reflected at the mirror reflector so that the driver views rearward via the reflection at the mirror reflective element. When the mirror reflective element is at the display mode orientation, visible light emitted by the display screen or device passes through the mirror reflector so as to be viewable by the driver of the vehicle viewing the mirror reflective element. The mirror head is tiltable or pivotable between the mirror mode orientation and the display mode orientation via an actuator 20 (FIGS. 2-15) that is electrically powered to impart a pivotal movement or flipping of the mirror head about a generally horizontal pivot axis.

The interior mirror thus can be used as a traditional mirror assembly, but can also be changed to a video monitor, such as through a use of a transflective surface or transflective mirror reflector and a high intensity display transposed behind the transflective surface or mirror reflector. The interior mirror assembly comprises a dual-mode interior rearview video mirror that can switch from a traditional reflection mode to a live-video display mode, such as is by utilizing aspects of the mirror assemblies and systems described in U.S. Pat. Nos. 10,442,360; 10,421,404; 10,166,924 and/or 10,046,706, and/or U.S. Publication Nos. US-2019-0258131; US-2019-0146297; US-2019-0118717 and/or US-2017-0355312, and/or U.S. provisional applications, Ser. No. 62/942,351, filed Dec. 2, 2019, Ser. No. 62/941,089, filed Nov. 27, 2019, and/or Ser. No. 62/942,305, filed Dec. 2, 2019, which are all hereby incorporated herein by reference in their entireties. The video display screen of the video mirror, when the mirror is in the display mode, may display video images derived from video image data captured by a rearward viewing camera, such as a rearward camera disposed at a center high-mounted stop lamp (CHMSL) location, and/or video image data captured by one or more other cameras at the vehicle, such as side-mounted rearward viewing cameras or the like, such as by utilizing aspects of the display systems described in U.S. provisional application Ser. No. 62/704,634, filed May 19, 2020, and U.S. provisional application Ser. No. 62/971,354, filed Feb. 7, 2020, which are hereby incorporated herein by reference in their entireties.

In the illustrated embodiment, the actuator 20 comprises a body 22 that houses a motor 24 and gear elements 26, with the body pivotally mounted at a mounting plate 28 (FIGS. 2 and 3) of the mirror reflective element. The mounting plate 28 may comprise the backing plate of the mirror reflective element or may comprise a separate mounting plate of the actuator, such that the mounting plate is attachable at the mirror head or backing plate to mount the actuator and mounting plate as a unit in the mirror head. In the illustrated embodiment, and such as shown in FIGS. 11-15, the actuator is attached at a back plate or chassis 28 that is disposed at the rear of the LED board and reflector and film stack and foam and thin film transistor (TFT) of the display screen 29. The display device is disposed at a frame and is attached at the rear of the EC cell 14 via tape or other suitable attachment means. A motherboard or circuit board 31 is disposed at the chassis 28 and an EMC shield and garage door opening device (such as a HOMELINK® device or the like) may be disposed in the mirror head at the circuit board and chassis. The actuator and mirror construction may utilize aspects of the actuator and mirror constructions described in U.S. Publication No. US-2018-0251069, which is hereby incorporated herein by reference in its entirety.

The body 22 includes a pivot element 30 (such as a socket element) for pivotally mounting or attaching to another pivot element of a mirror mount (such as to a ball member of a mirror mount or mirror stay that is attached at the headliner of the vehicle or at an in-cabin surface of the vehicle windshield) so as to establish a pivot joint. The actuator includes a pivot mount 32 at each side for pivotally mounting or attaching the actuator at the backing plate 28, and also includes cam followers 34 that have arcuate slots that receive a respective pin at the backing plate 28 (such as at a mounting stanchion or boss at the backing plate). Thus, when the cam followers 34 are pivoted (via actuation of the motor driving the gear elements) about their axes of rotation 33, the pins 35 move along the slots to pivot the body 22 and pivot element 30 about the pivot axis at the pivot mounts 32 and relative to the mirror backing plate (and thus relative to the mirror reflective element).

The rotating cam mechanism is used to create mechanical advantage, and to provide linear movement about a fixed point. The fixed axis of rotation (at the pivot mounts 32) creates an angle change for the body that is connected to the cam shaft and fixed point. The angle change is seen with regards to the body connected to the fixed point of rotation, and the cam follower. The actuator optionally includes a detent at each end of cam groove help to lock each follower in place when the actuator pivots the mirror head to the mirror mode orientation or the display mode orientation, which provides added stability while under vibration. The actuator uses two closed cams to create added stability for the mechanism.

The actuator may provide a 'slow transition' toggle actuation for the mirror display. This transition ties into the digital mirror function. Because the pivoting or adjustment of the mirror head is slowed down, the camera (and video display) activation and deactivation are adjusted so that a rear view image is always provided to the driver when transitioning between the mirror mode and the display mode. Therefore, the display is turned on before the mirror head starts moving from the mirror mode orientation to the display mode orientation. Once the user's eyes have adjusted/focused on the digital display, the mirror can transition so the reflection out the rear of the vehicle no longer makes it to the driver's eyes. The opposite is true for transitioning from the display mode orientation back to the mirror mode orientation, where the display stays activated until the mirror head is back to the initial mirror mode orientation or position. The actuator can also be tied in with the electronics of the interior rear mirror in order to get the state of the mirror (e.g. a switch). The slow transition may be so that the mirror head pivots at a rate of less than about 10 degrees per second, such as less than about 7 degrees per second, such as in a range of about 2 degrees per second to about 7 degrees per second.

The sound/noise levels of the actuator are greatly reduced by running the motor at less than rated voltage. This can be achieved with linearly (variable voltage regulation) or through the application of a pulse width modulation (PWM) signal. The selected motor driver has an analog input pin which is used to set the duty cycle on the motor control. The software allows the motor/actuator to be cinched at both ends of travel by increasing the voltage and thus the torque of the actuator when coming into and out of a stop position. This 'profile' can be adjusted for different requirements or desired features (speed, time, cinching, ramp, etc.).

Although the actuator may be driven at a constant voltage throughout the transition, the transition may optionally (and desirably) be run through several zones. For example, and with reference to the graph of FIG. 10, in a first zone (zone 1), the actuator may operate at a low or reduced constant voltage to take up gear train backlash. In a second zone (zone 2), the voltage is ramped up from zone 1 to a set higher voltage to ensure that the cams are able to get out of the previously cinched position. In a third zone (zone 3), the actuator is run at a constant low or reduced voltage throughout the actuator transition to provide the lowest possible sound output. This low voltage also means that the transitions happens slower (where the mirror head may pivot at a rate of less than about 10 degrees per second, such as less than about 7 degrees per second, such as in a range of about 2 degrees per second to about 7 degrees per second). In a fourth zone (zone 4), the voltage is ramped up from the low voltage in zone 3, to the same level as was achieved in zone 2. This assures that the actuator is able to cinch, but does so in a smooth transition to prevent any audible irregularities caused by a sudden change in actuator speed. In a fifth zone (zone 5), the actuator is run at the peak voltage achieved in zone 4 for a short period to assure that the actuator is cinched. Such a multiple zone voltage profile is exemplified in FIG. 10, where the advanced drive strategy allows the actuator to be driven slower and quieter.

Figure 16:
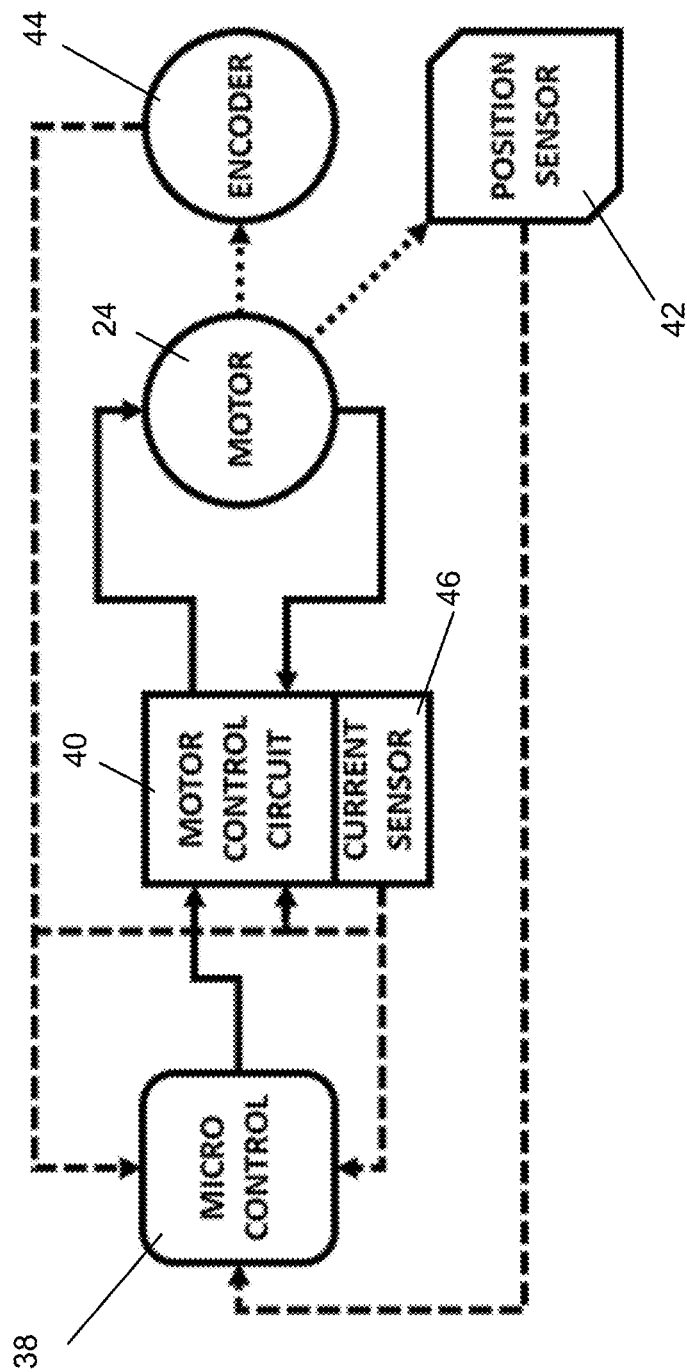
FIG. 16 is a block diagram of a control circuit of the actuator.
Figure 17:
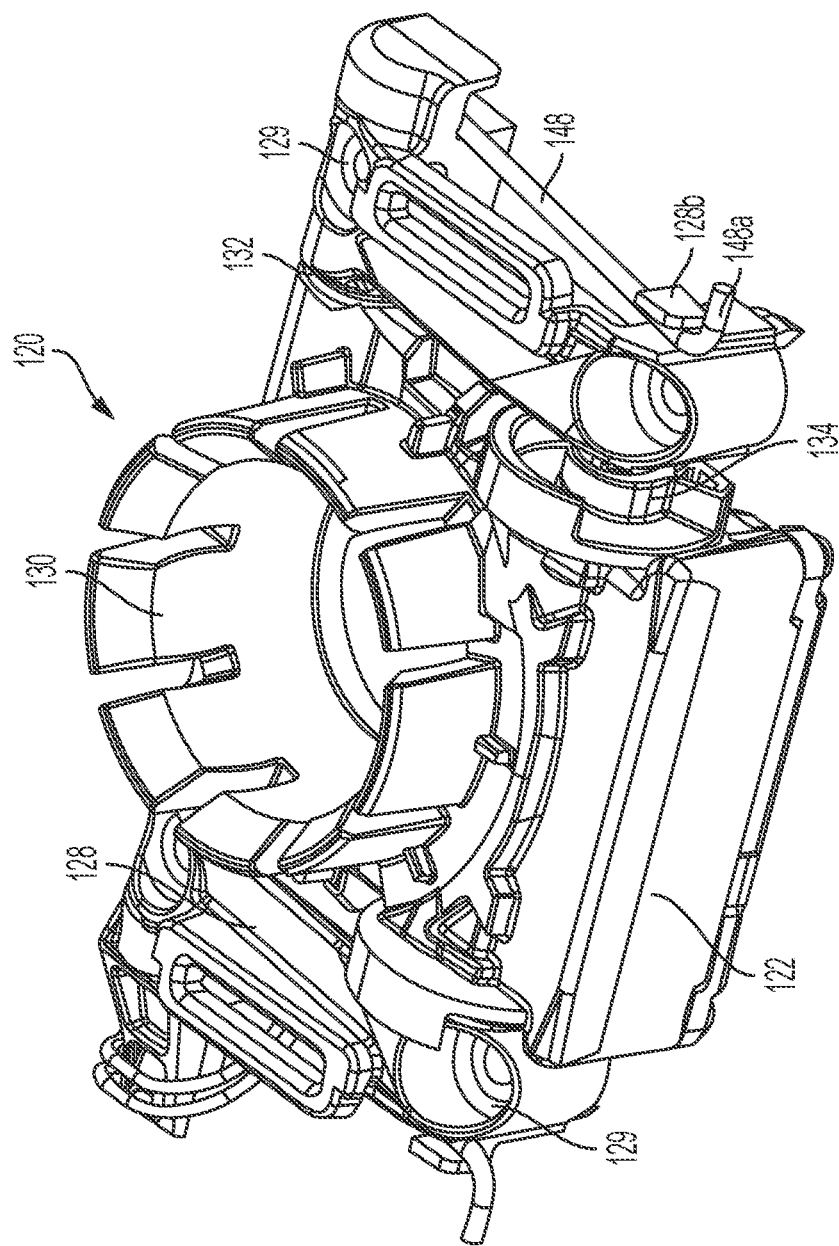
Figure 20:
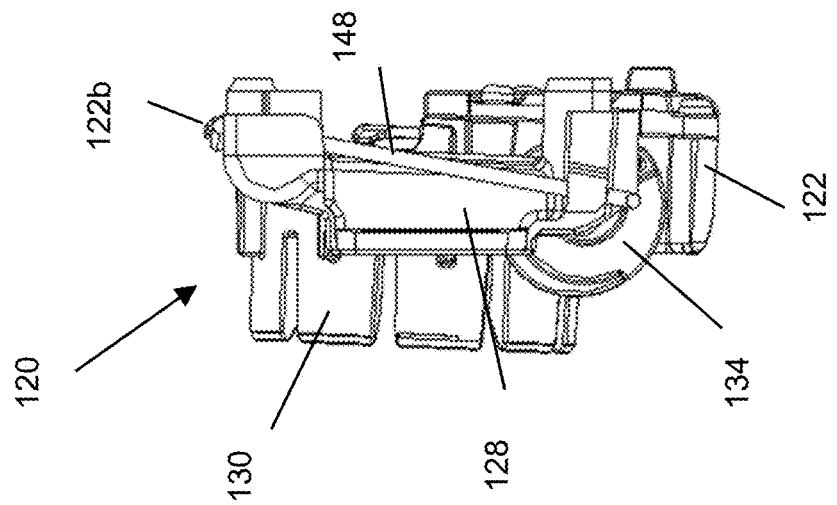
FIG. 20 is a side elevation of the actuator.

Optionally, and with reference to FIG. 16, the actuator may include a microcontroller 38 that operates to control a motor control circuit 40 for controlling the motor 24. The actuator may be operated via closed loop control. By using closed loop control to run the motor at a constant speed, the sound can be kept constant, and the open loop profile can be created naturally. Either a software or hardware control loop can be used, and either method can use a software controlled reference input. The software control can use an input (to the microcontroller 38 from a distance sensor or position sensor 42, an encoder 44 (quadrature or single pulse), or a current sensor 46, and can use the same PWM output as the open loop control. The hardware control can use an input from the encoder 44 (quadrature or single pulse) or the current sensor 46. The advantages of a hardware control loop include faster response time and less software overhead.

Figure 7:
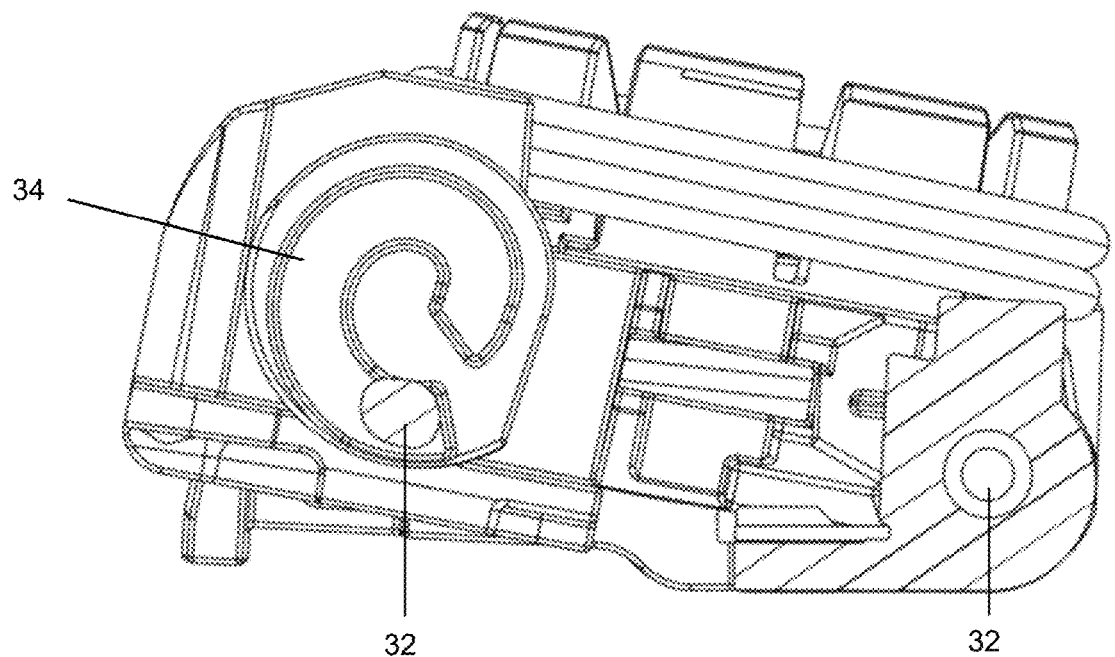
FIG. 7 is a side elevation of the actuator showing the cam element.
Figure 8:
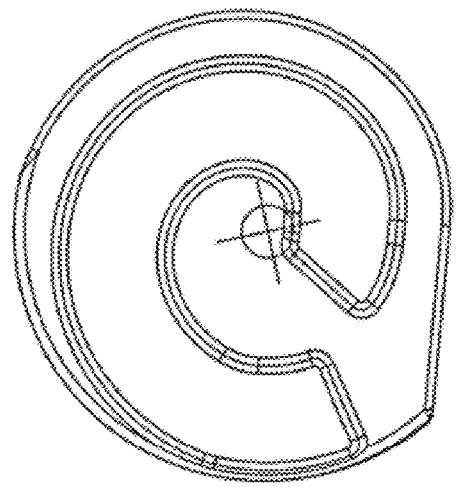
FIG. 8 is an enlarged view of the cam element.
Figure 9:
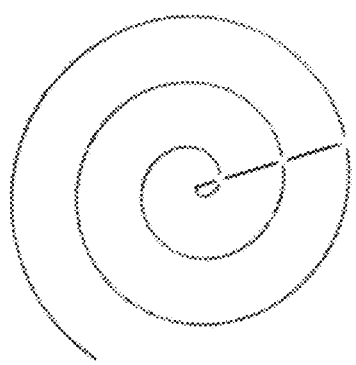
FIG. 9 is a schematic of an Archimedes Spiral, from which the shape of the cam element is derived.
Figure 10:
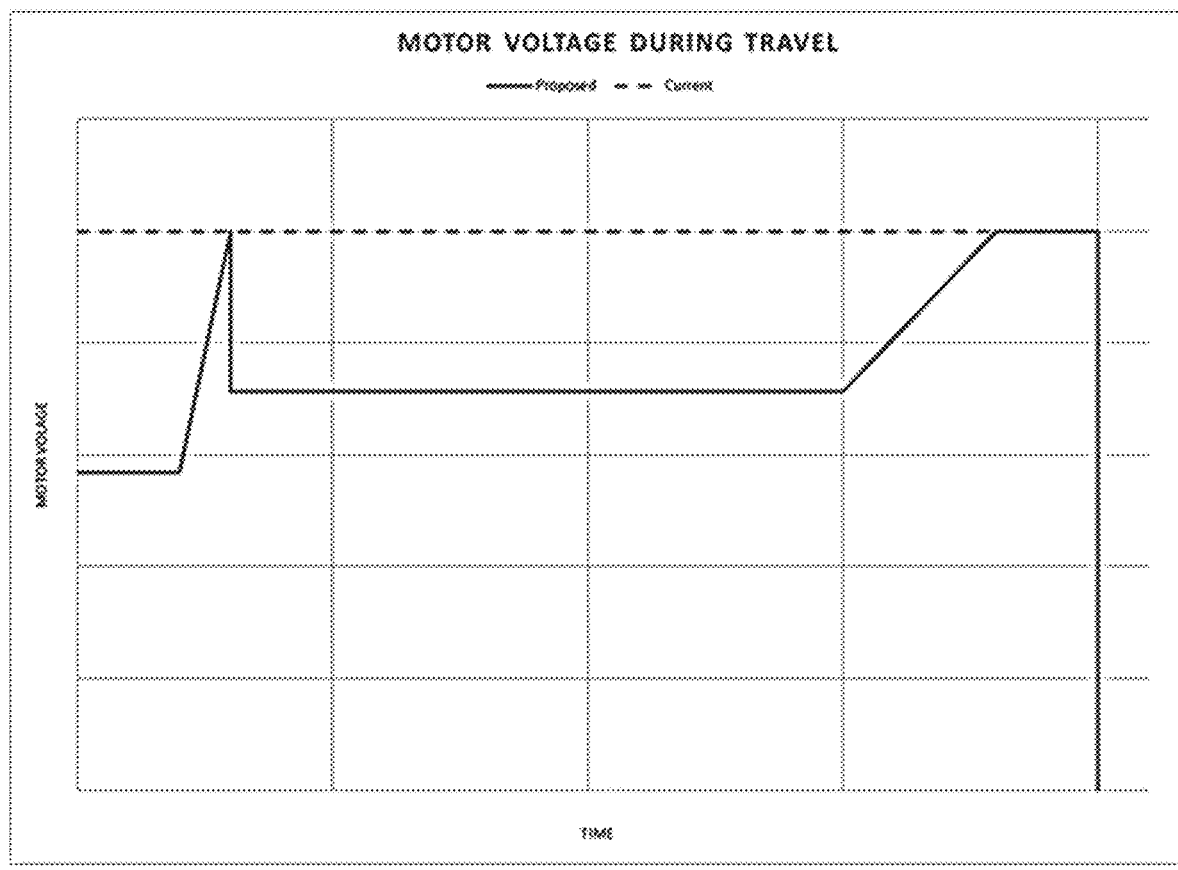
FIG. 10 is a graph showing motor voltage vs. time during operation of the actuator.
Figure 11:
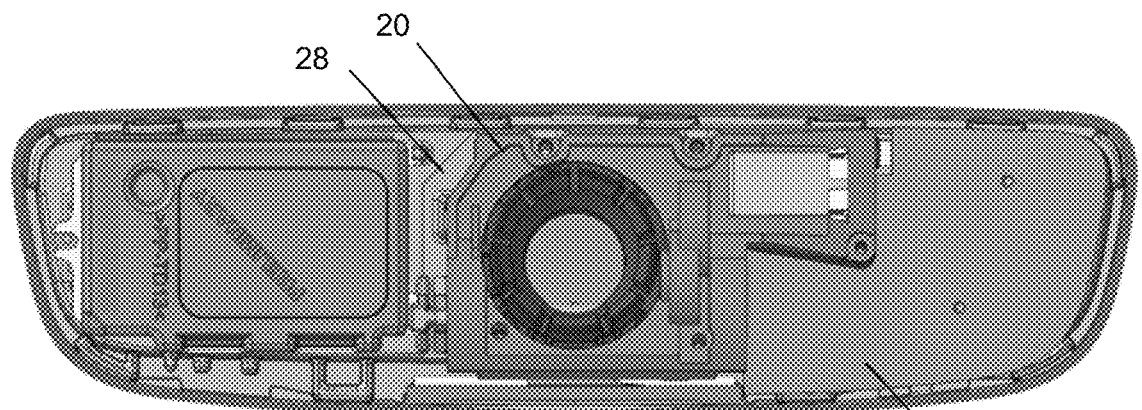
FIG. 11 is a plan view of the actuator attached at a chassis of a mirror reflective element.
Figure 12:
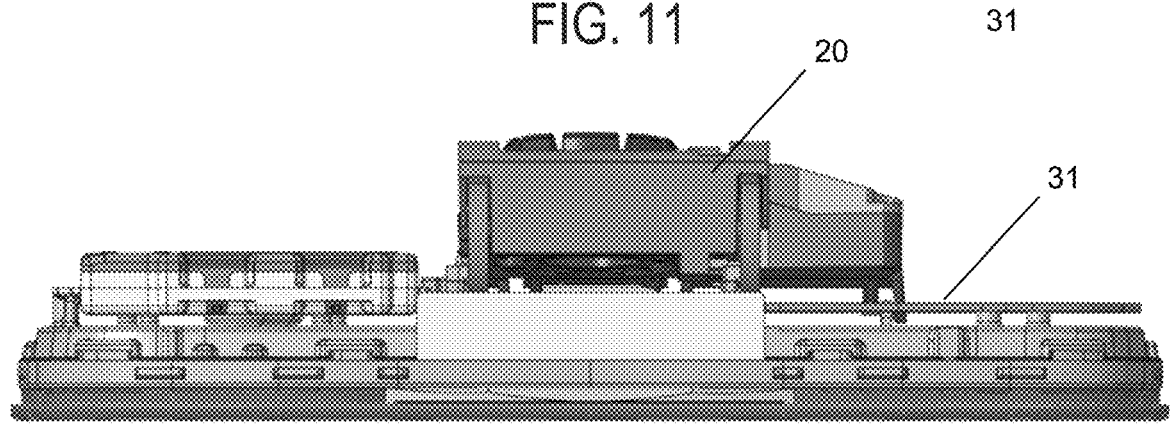
FIGS. 12 and 13 are side views of the actuator and chassis and mirror reflective element of FIG. 11.
Figure 13:
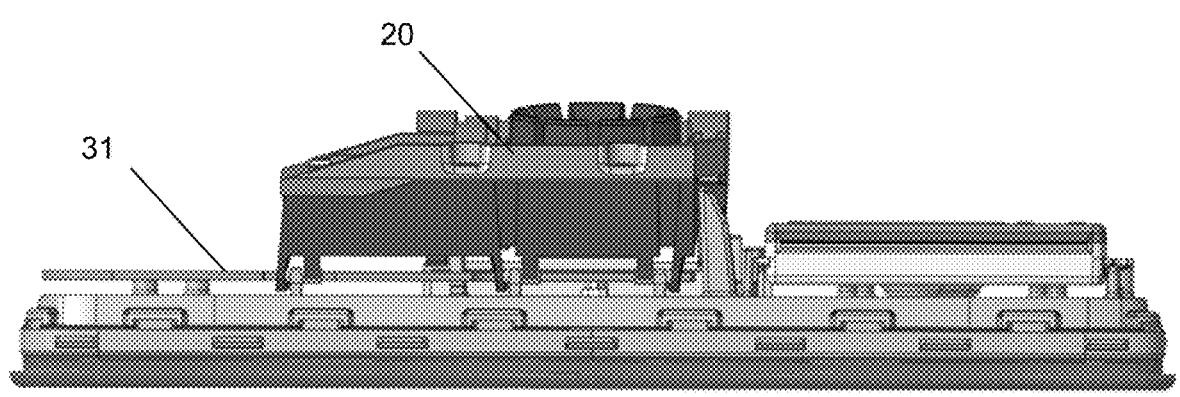
Figure 14:
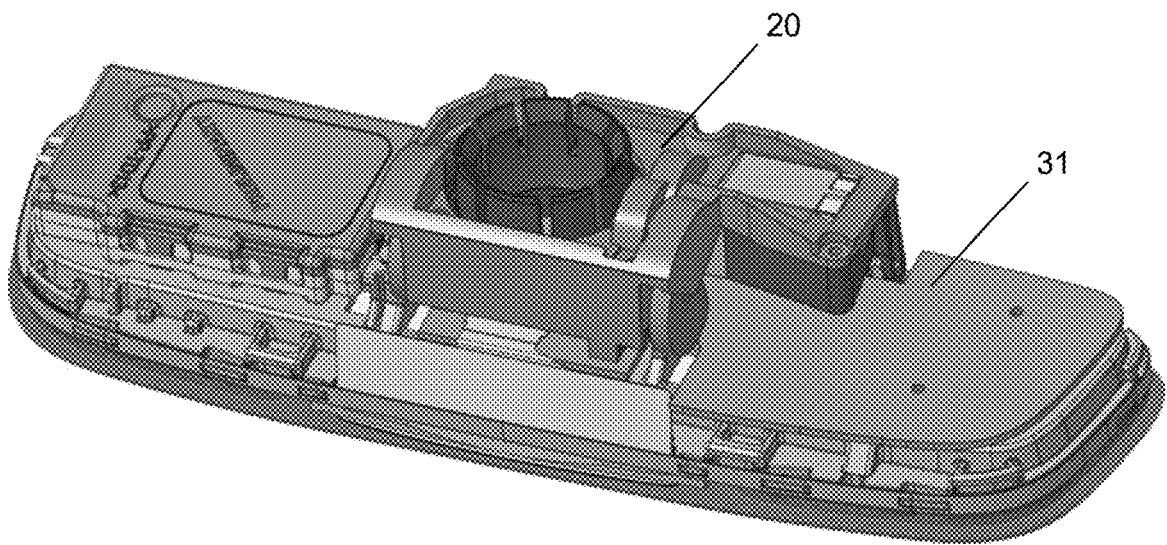
FIG. 14 is a perspective view of the actuator and chassis and mirror reflective element of FIG. 11.
Figure 15:
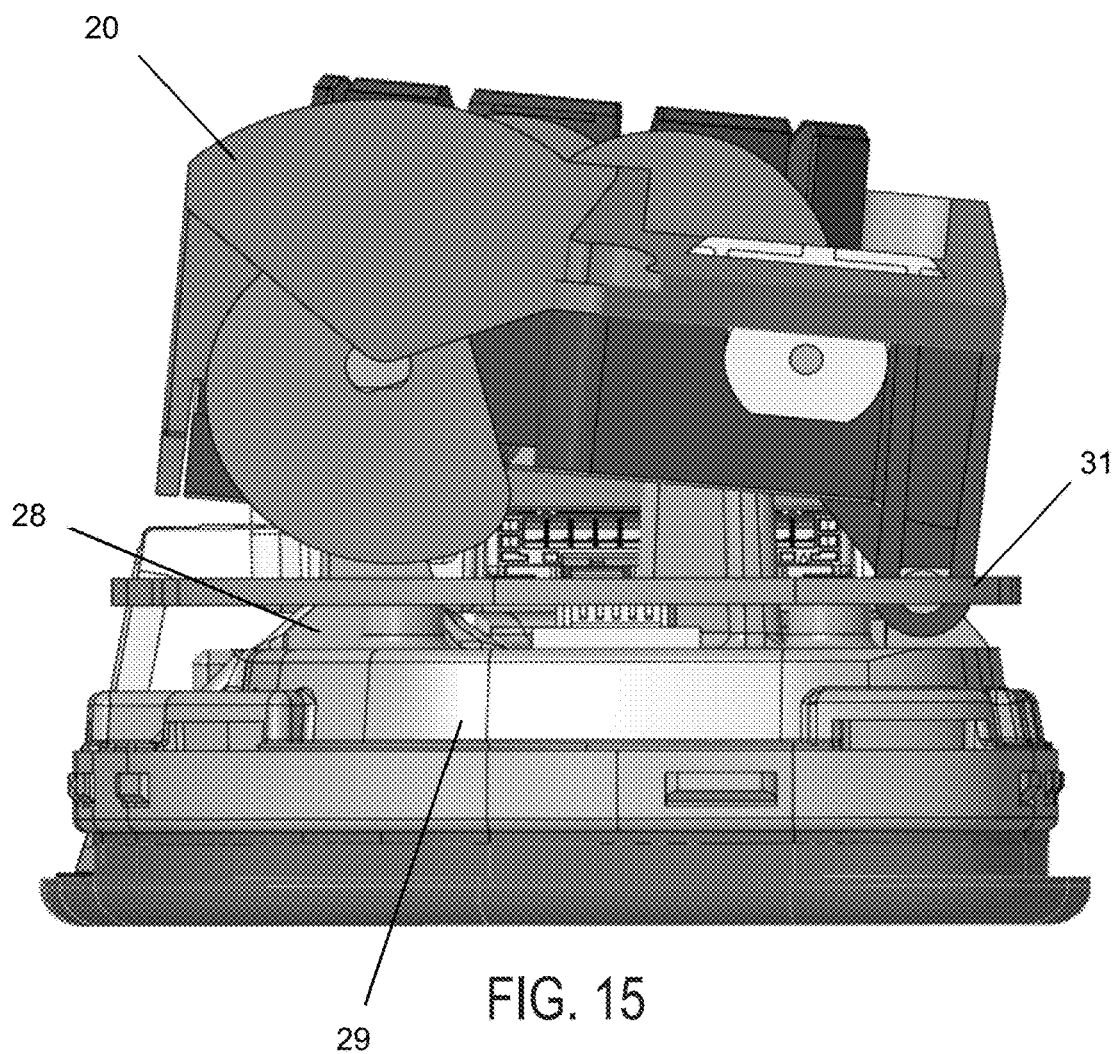
FIG. 15 is an end view of the actuator and chassis and mirror reflective element of FIG. 11.

The cam follower provides a non-uniform or non-circular spiral, such as an Archimedes or Archimedean spiral form (see FIGS. 7-9). With an offset circular cam geometry, the angular velocity of the actuator (about its uppermost pivot) is parabolic, which causes an inconsistent sound profile during actuation. Such a form may be derived from the equation r=aθ, where a is a constant, r is the length of the radius from the center, or beginning, of the spiral, and θ is the angular position (amount of rotation) of the radius. The Archimedes spiral cam geometry allows the angular velocity of the actuator (about its uppermost pivot) to remain constant. This causes the sound profile of the actuator to be constant and quieter than the sound profile of the actuator using an offset circular cam geometry. As shown in FIGS. 7 and 8, the arcuate groove of the cam follower spans greater than 180 degrees from its end point and optionally greater than 270 degrees and optionally greater than 330 degrees, to allow for the desired pivoting range of the actuator relative to the mirror reflective element.

To prevent back driving of the actuator, the path or arcuate groove or channel of each cam flattens out at each end to a circular arc centered about the cam's pivot. This means that once the cam reaches the end of travel (in either direction), it cannot be back driven. Any force applied to the actuator (while it is in either cinched position or end position) goes directly through the center of the cam pivot, meaning that torque will not be generated on the cams.

The actuator's DC motor 24 used in conjunction with the spur gear train 26 thus transfer movement with increased torque to the "closed cam" in order to tilt the actuator and to cause the mirror head to pivot upward or downward relative to the pivot element that mounts the mirror head at the mirror mount or stay.

Figure 5:
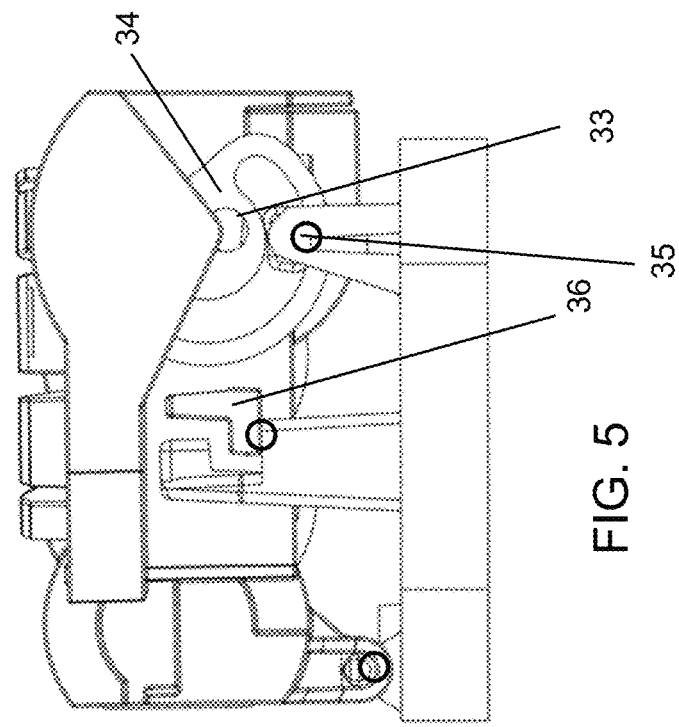
FIGS. 5 and 6 are side elevations of the actuator, showing the stop element stopping pivotal movement of the actuator in either direction.
Figure 6:
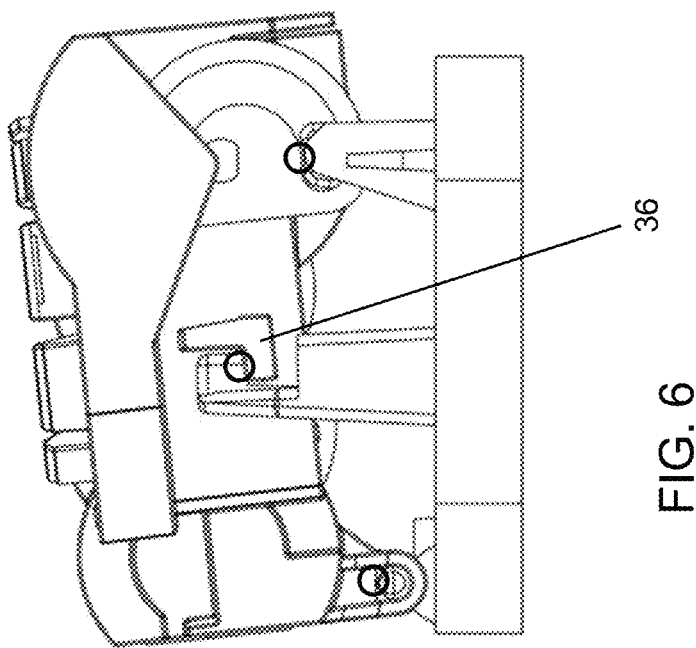

Optionally, and such as shown in FIGS. 5 and 6, the actuator includes travel stops to limit pivotal movement of the actuator in either directions. In the illustrated embodiment, the travel stop 36 is located at a center region of the actuator and creates a load path directly between the mirror assembly and the mirror stay. As shown in FIG. 5, when the actuator pivots in one direction, the travel stop engages a first stop element of the mounting plate to limit pivotal movement in that direction and, when the actuator pivots in the other direction (as shown in FIG. 6), the travel stop engages a second stop element to limit pivotal movement in that direction. The three point loading creates optimal connection and increased vibration stability. Optionally, and desirably, the cam lobes do not reach the end of travel or the end of the arcuate grooves when the travel stop stops pivotal movement. Once the travel stop is hit, friction force on cams increases until the cam can no longer rotate. This provides a very sturdy connection between the actuator and the mirror assembly.

Optionally, the actuator may be spring-biased toward an initial position, whereby operation of the actuator motor in one direction pivots the mirror head in a direction against the spring bias or force and operation of the motor in the opposite direction pivots the mirror head in the opposite direction with the spring bias or force assisting in pivoting the mirror head in that direction. For example, pivoting the mirror head in a downward direction may be against the biasing force while pivoting the mirror head in an upward direction may be with biasing force assistance.

As shown in FIGS. 17-26, an actuator 120 includes a body 122 that houses a motor 124 and gear elements 126, with the body pivotally mounted at a base portion 128, which is configured to be attached at the rear of the mirror reflective element (such as via a plurality of fasteners or screws that are received at bosses 129 for threading into structure at the rear of the display device at the rear of the mirror reflective element). The body 122 includes a pivot element 130 (such as a socket element) for pivotally mounting or attaching to another pivot element of a mirror mount (such as to a ball member of a mirror mount or mirror stay that is attached at the headliner of the vehicle or at an in-cabin surface of the vehicle windshield) so as to establish a pivot joint. The actuator 120 includes a pivot mount 132 at each side for pivotally mounting or attaching the actuator body 122 at the base portion 128, and also includes cam followers 134 that have arcuate slots that receive a respective pin 128*a* (FIG. 25) at the base portion 128 (such as at a mounting stanchion or boss at the backing plate), such as similar to actuator 20, discussed above.

Figure 25:
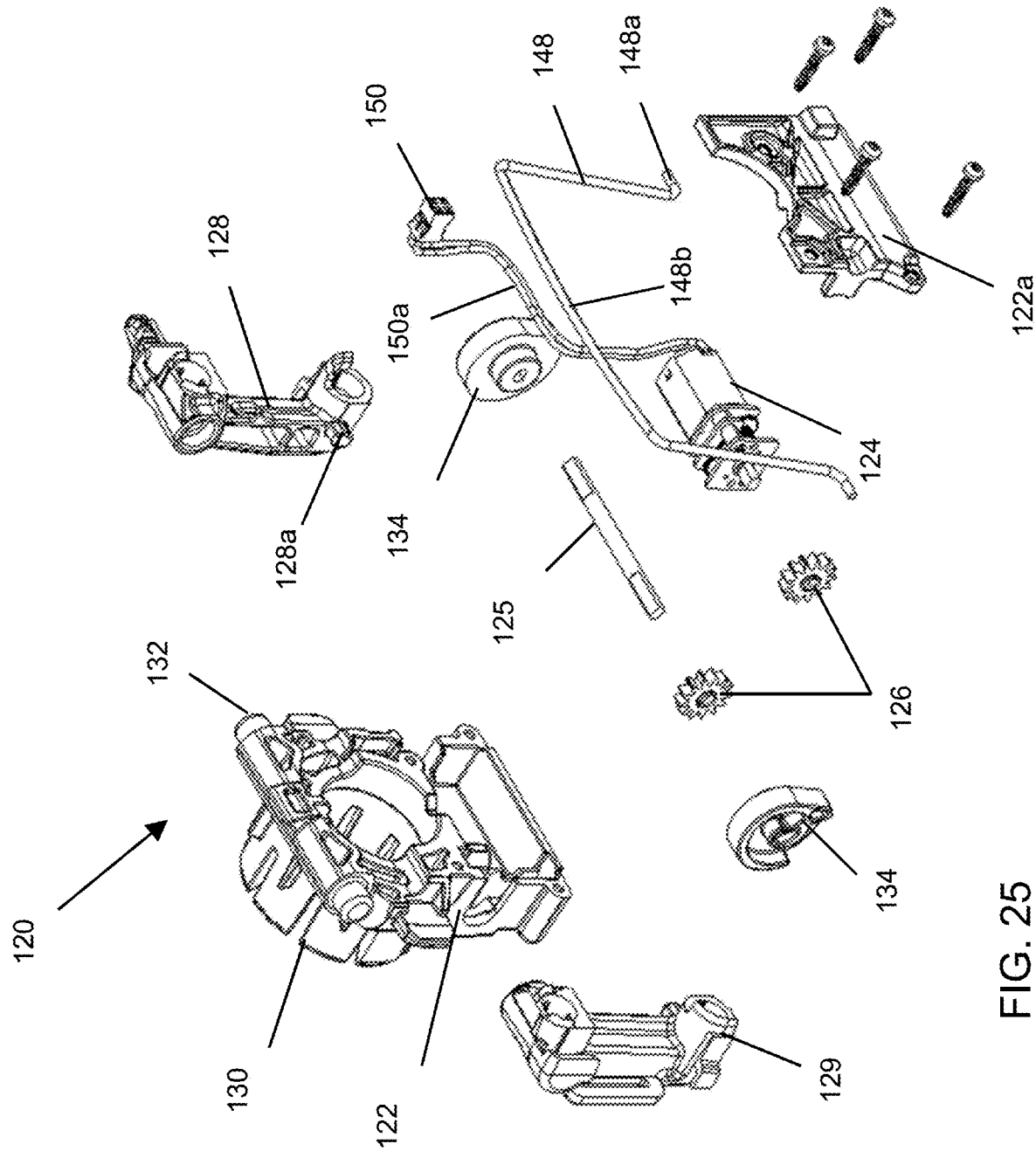
FIG. 25 is an exploded perspective view of the actuator.

As shown in FIG. 25, the cam followers 134 are non-rotatably mounted at or keyed at a shaft 125 (such as a shaft having non-circular ends that are received in correspondingly shaped non-circular apertures of the cam followers) that is rotatably driven by the motor 124 and gears 126. Thus, when the cam followers 134 are pivoted (via actuation of the motor driving the gear elements) about their axes of rotation, the pins move along the slots to pivot the body 122 and the pivot element 130 about the pivot axis at the pivot mounts 132 and relative to the mirror backing plate (and thus relative to the mirror reflective element). The motor and gears are contained or housed in the body portion 122 (such as via a cover plate or element 122*a* being attached at the body to encase the motor and gears within a cavity of the body).

In the illustrated embodiment, the actuator 120 includes a spring element 148 that has its ends 148*a* attached at tabs 128*b* of the base portion 128 and that has a center region 148*b* engaged with a tab 122*b* of the body 122. The spring may be installed under a preloaded or flexed condition (see FIG. 24). Thus, when the body 122 is pivoted (via actuation of the motor to rotate the gears in one direction), the tab is urged against the spring element which flexes to allow for the pivotal movement, but which also exerts a return force to ease the pivoting of the body in the opposite direction (when the motor is actuated to rotate the gears in the opposite direction). For example, and such as can be seen with reference to FIG. 20, when the body is pivoted counter-clockwise direction to tilt the mirror head downward, the tab 122*b* is urged against the spring element, and when the body is pivoted in the clockwise direction to tilt the mirror head upward, the spring element assists in the pivotal movement to return to its initial non-flexed or less-flexed state. Thus, the spring-biasing assists in pivoting the mirror head upward to reduce load on the motor and gears.

Figure 19:
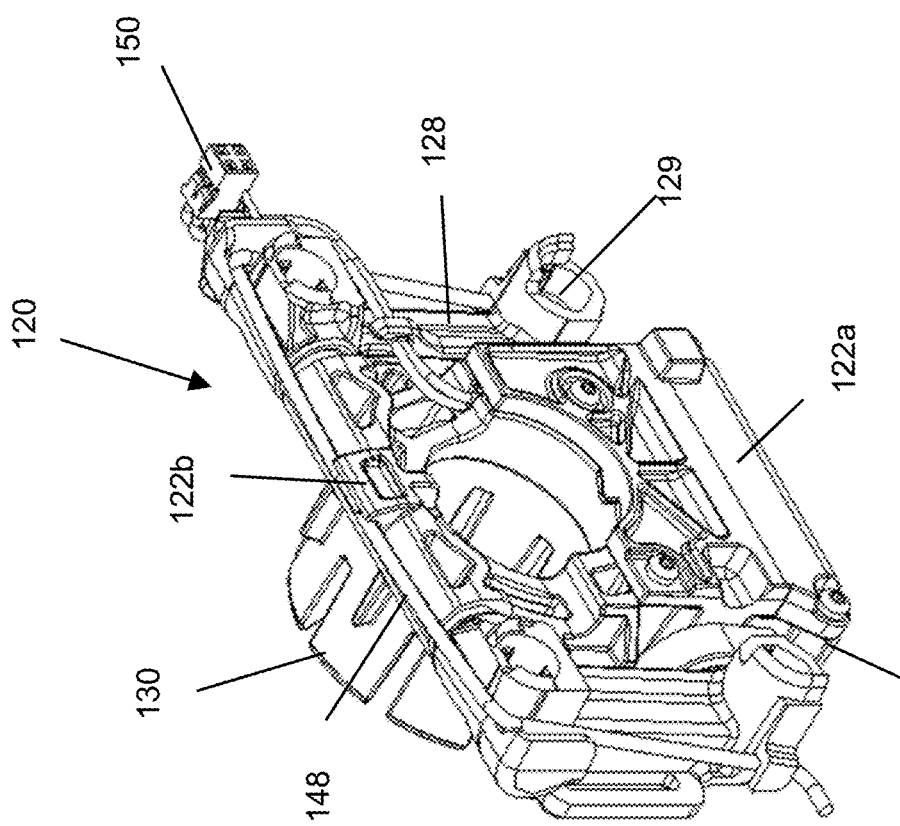
Figure 22:
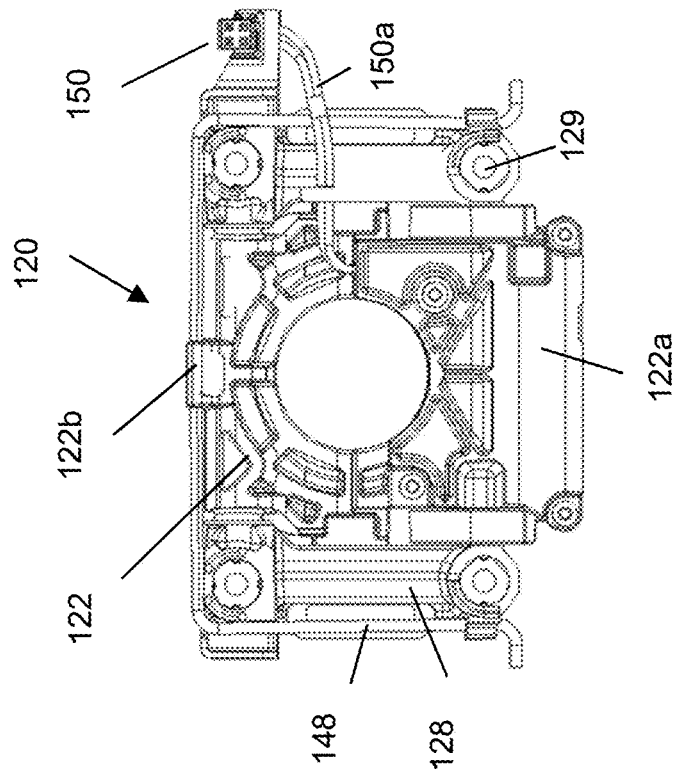
FIGS. 21 and 22 are rear and front views of the actuator.
Figure 21:
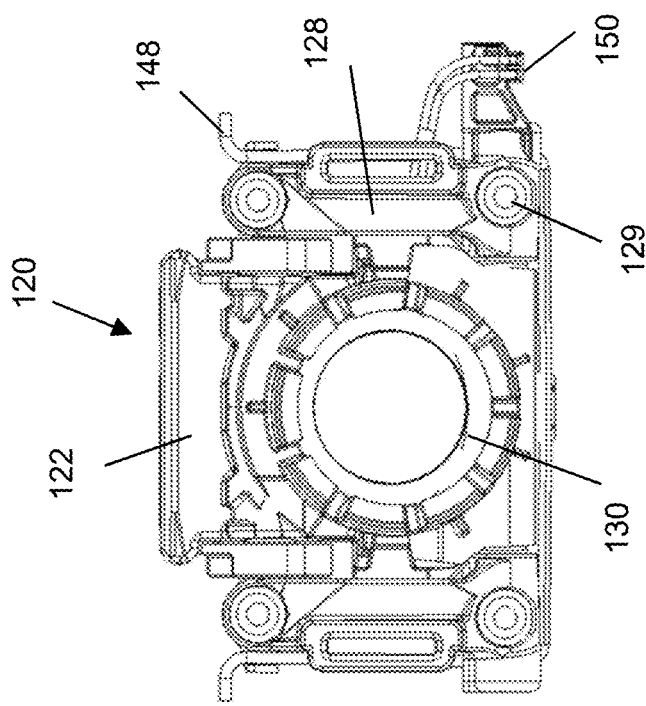

As shown in FIG. 19, the actuator 120 includes an electrical connector 150 that is electrically connected to the motor via wires 150*a* routed along the base portion and body portion. The electrical connector is attached at or integrated with the actuator. In the illustrated embodiment, the integrate connector is disposed at and attached to the base portion and is configured to electrically connect to terminals of the circuitry of the mirror head as or when the actuator is attached (via the fasteners) at the rear of the display device at the rear of the mirror reflective element. For example, the connector 150 may comprise a multi-pin receptacle that receives multiple pins or terminals therein. The circuit board of the mirror head may include a connector portion that has a plurality of pins or terminals that are received in the connector 150 as the actuator is fastened (or otherwise attached, such as snap-attached) at structure at the rear of the display device and mirror reflective element.

Figure 26:
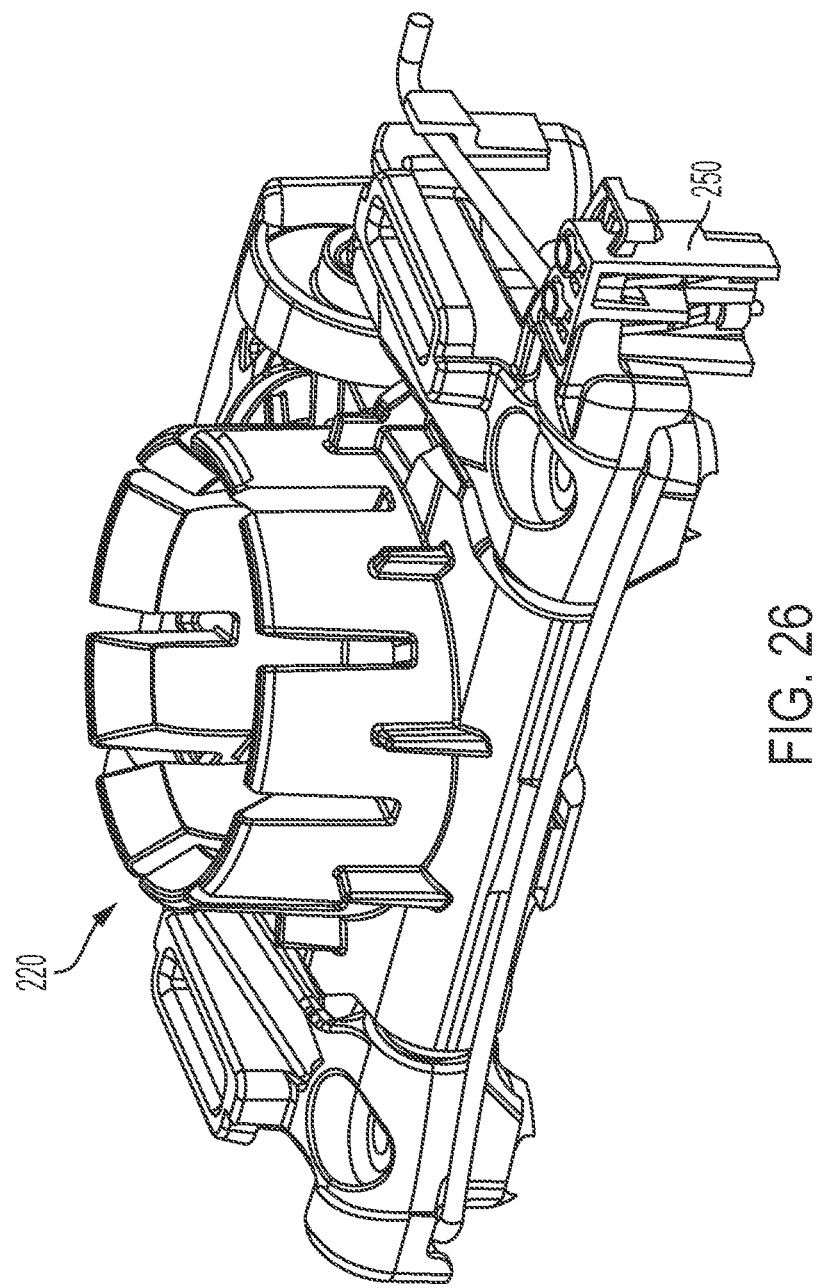
FIG. 26 is a perspective view of another actuator that pivots the mirror head between the display mode orientation and the mirror mode orientation.

Optionally, and with reference to FIG. 26, the actuator 220 may include an electrical connector 250 that is configured to electrically connect to terminals or connecting elements at the circuit board via two or more spring-loaded connectors. For example, the electrical connector 250 may include a pair of spring-loaded connectors that electrically connect to pads or connecting elements at the circuit board and that compress as the actuator is attached at the structure, whereby the spring-biasing of the connectors maintains electrical connection integrity. The electrical connection of the actuator to the circuitry at the circuit board may utilize aspects of the connectors described in U.S. Pat. Nos. 10,466,563 and/or 9,878,669, which are hereby incorporated herein by reference in their entireties. The actuator 220 may otherwise be similar to the actuator 120, discussed above, such that a detailed discussion of the actuators need not be repeated herein.

The present invention thus provides a mirror display system that can display video images across the entire reflective surface of an interior rearview mirror assembly. The display system may include a display device disposed at an upper region of the vehicle's interior cabin (or other location), such that, when the mirror head is tilted or angled or otherwise mechanically adjusted, the mirror reflective element reflects the displayed image across the entire reflective surface for viewing by the driver of the vehicle. Optionally, and desirably, the display system includes a video display screen disposed in the mirror head and viewable (when activated) through the reflective element. For example, when the mirror head is adjusted to a "mirror mode", the driver can view the rearward field of view provided by the reflective element, but when the mirror head is tilted or adjusted (to a "display mode"), the displayed video images (such as derived from image data captured by a rearward viewing camera) are viewable by the driver of the vehicle, with the tilting of the mirror head causing the primary reflection off of the reflective element to be out of the driver's eyes (since it would be aimed up toward the headliner or down into the cabin area instead of out the rear window).

The mirror system includes the electronically operable actuator that is operable to adjust or pivot the mirror head between the mirror mode orientation and the display mode orientation. For example, the mirror actuator may move the mirror head to the display mode orientation responsive to a user input or responsive to the driver shifting the vehicle into a reverse gear, whereby a rear backup camera is actuated and the display displays video images derived from image data captured by the rear backup camera.

The actuator thus performs the rotation of the mirror head like a traditional manual flip-tab/toggle mechanism would. The actuator pivots the mirror head of a full-size-video display inside mirror so the mirror head can be used as an interior rearview mirror (mirror mode) or as a full mirror display screen (display mode). When the user hits a switch or button, the actuator tilts the mirror and the digital display turns on. The tilting action gets the primary reflection out of the driver's eyes as it would be aimed up into the headliner or down into the cabin area instead of out the rear window. The video display screen may span substantially the entire length and width of the reflective element. For example, the video display screen length dimension (lateral dimension across the vehicle when the mirror assembly is installed in the vehicle) may span at least 75 percent of the reflective element length (or of the length of the viewable reflective region of the mirror reflective element) and the video display screen width dimension (vertical dimension when the mirror assembly is installed in the vehicle) may span at least 75 percent of the reflective element width dimension (or of the width of the viewable reflective region of the mirror reflective element). Optionally, the video display screen length dimension may span at least 95 percent (and may span the entirety) of the reflective element length and the video display screen width dimension may span at least 95 percent of the reflective element width dimension.

The driver thus may adjust the mirror head (via pivoting the mirror head at the pivot joint at the mirror mount or stay) to provide the desired reflective rearward field of view through the rear window of the vehicle. After the mirror head is set in this manner, when the actuator is actuated to pivot the mirror head to the display mode orientation, the mirror head pivots without changing the driver-selected orientation of the socket and ball member pivot joint. Thus, when the actuator is again actuated to pivot the mirror head back to the mirror mode orientation, the mirror reflective element will again be set to the driver's rearward viewing preference.

Optionally, the driver may manually adjust the mirror head between the mirror mode orientation and the display mode orientation, such as by pivoting the mirror head in a normal manner. Optionally, the mirror head may have a toggle or the like that toggles or flips the mirror head between a mirror mode and a display mode (such as a toggle that functions in a similar manner as prismatic mirror toggles that flip a prismatic mirror between day and night orientations).

Optionally, the actuator that provides up/down adjustment of the mirror head, such as for a toggle type of adjustment for known prismatic mirrors, may comprise a micro-gearhead motor so as to provide a reduced profile or smaller package size of the actuator, such as by utilizing aspects of the reduced profile actuator described in U.S. Publication No. US-2018-0251069, which is hereby incorporated herein by reference in its entirety.

The display device is operable to display video images (such as derived from image data captured by one or more cameras of the vehicle, such as one or more cameras having rearward and/or sideward exterior fields of view and/or one or more cameras having interior fields of view in the cabin of the vehicle) when the mirror head is in its display mode orientation. The display device or module may utilize aspects of the modules described in U.S. Publication Nos. US-2018-0134217 and/or US-2014-0285666, which are all hereby incorporated herein by reference in their entireties.

The display screen preferably displays the captured video images at the entire viewable portion of the display screen, in order to provide relatively large displayed images for viewing by the driver of the vehicle while the driver is normally operating the vehicle. In the illustrated embodiment, the user inputs are touch or proximity sensors disposed at a portion of the display screen. The video display screen, when normally operating to display video images captured by the camera, may display the video images over the entire display portion or active portion of the display screen and, responsive to a user input (such as a user or driver touching a portion of the display screen or touch screen), may display icons or indicia at a portion of the display screen to indicate where the user can touch to actuate or control the display settings or the like. The user inputs or touch sensors may comprise any suitable sensors or inputs, and may utilize aspects of the inputs and sensors described in U.S. Pat. Nos. 9,827,913; 9,598,016; 9,346,403; 8,730,553; 8,508,831; 8,154,418; 7,255,451; 7,253,723 and/or 7,224,324, which are hereby incorporated herein by reference in their entireties.

Optionally, for example, an interior rearview mirror assembly with a full screen display may not include any user inputs or buttons or sensors. Optionally, the interior mirror and display assembly may include touch sensors or buttons (such as capacitive touch sensors or buttons) disposed along a lower portion of the mirror bezel, or along a widened lower portion of the bezel. Optionally, a single touch sensor or button or user input may be provided at the mirror, and may be customized for the particular vehicle or application or the like. As the mirror should be controlled with minimal driver distraction, the user input may operate, responsive to a short button press or touch, to change the mirror state, and may operate, responsive to a longer button press or touch, to provide output for other functions.

The mirror assembly and mirror reflective element may comprise any suitable construction, such as, for example, a mirror assembly with the reflective element being nested in the mirror casing and with a bezel portion that circumscribes a perimeter region of the front surface of the reflective element, or with the mirror casing having a curved or beveled outermost exposed perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties), or such as a mirror assembly having a rear substrate of an electro-optic or electrochromic reflective element nested in the mirror casing, and with the front substrate having a curved or beveled outermost exposed perimeter edge, or such as a mirror assembly having a prismatic reflective element that is disposed at an outer perimeter edge of the mirror casing and with the prismatic substrate having an outermost exposed curved or beveled perimeter edge, such as described in U.S. Pat. Nos. 9,827,913; 9,174,578; 8,508,831; 8,730,553; 9,598,016 and/or 9,346,403, which are hereby incorporated herein by reference in their entireties (and with electrochromic and prismatic mirrors of such construction are commercially available from the assignee of this application under the trade name INFINITY™ mirror).

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

Optionally, and desirably, the touch sensor is disposed behind the mirror reflective element and with 10 mm above the lower perimeter edge of the rear substrate. The touch sensor may be disposed in such a 10 mm band and kept from the plastic housing and disposed inboard of (or above) the radiused outermost exposed perimeter edge of the reflective element glass substrate (such as a rounded or curved or radiused outermost exposed perimeter edge of a front glass substrate of an electrochromic mirror reflective element, with the outermost exposed perimeter edge of the front glass substrate having about a 2.8 mm radius or 2.5 mm radius or thereabouts).

The mirror may function in a mirror mode, where the display is deactivated and the driver views rearward via reflection at the mirror reflector of the reflective element, or the mirror may function in a display mode, where the display is activated and the driver views the displayed images at the mirror reflective element. The changes between mirror mode and display mode may be responsive to a user input, and the mirror head may automatically pivot (via an actuator of the mirror assembly) to the appropriate orientation for the selected mode, such as described above. The images displayed may be derived from image data captured by a rearward viewing camera of the vehicle, such as a rear backup camera, and may provide the field of view similar to what is provided by the mirror reflector when the mirror is in its mirror mode (such as by utilizing aspects of the systems described in U.S. Publication No. US-2019-0258131, which is hereby incorporated herein by reference in its entirety).

Optionally, the display may utilize aspects of the displays of the types disclosed in U.S. Pat. Nos. 5,530,240 and/or 6,329,925, which are hereby incorporated herein by reference in their entireties, and/or of display-on-demand or transflective type displays, such as the types disclosed in U.S. Pat. Nos. 7,855,755; 7,777,611; 7,626,749; 7,581,859; 7,446,924; 7,446,650; 7,370,983; 7,338,177; 7,274,501; 7,255,451; 7,195,381; 7,184,190; 6,690,268; 5,668,663 and/or 5,724,187, and/or in U.S. Publication Nos. US-2006-0050018, which are all hereby incorporated herein by reference in their entireties. The display may be viewable through the reflective element when the display is activated to display information.

Changes and modifications to the specifically described embodiments may be carried out without departing from the principles of the present invention, which is intended to be limited only by the scope of the appended claims as interpreted according to the principles of patent law.

The invention claimed is:

1. A vehicular interior rearview mirror assembly, the vehicular interior rearview mirror assembly comprising:
   a mirror head having a reflective element;
   wherein the reflective element comprises a glass substrate having a transflective mirror reflector coated at a surface thereof, and wherein the transflective mirror reflector is partially reflective of visible light incident thereat and partially transmissive of visible light;
   a display device disposed in the mirror head and behind the reflective element, wherein the display device comprises a video display screen that is operable to display video images that are viewable through the transflective mirror reflector of the reflective element;
   wherein, with the vehicular interior rearview mirror assembly attached at an interior portion of a vehicle, the mirror head is adjustable between (i) a mirror mode orientation, in which the video display screen is not displaying video images and a driver of the vehicle views rearward of the vehicle using the transflective mirror reflector of the reflective element, and (ii) a display mode orientation, in which the video display screen is displaying video images viewable by the driver of the vehicle through the transflective mirror reflector of the reflective element;
   wherein, with the vehicular interior rearview mirror assembly attached at the interior portion of the vehicle, and with the mirror head is in the display mode orientation, the video display screen displays video images derived from video image data captured by a camera of the vehicle viewing exterior the vehicle;
   an actuator, wherein the actuator comprises an electrically-operable motor that, when operated, moves a cam follower of the actuator;
   wherein the cam follower of the actuator has a groove that is traveled along by a pin disposed at the mirror head, and wherein operation of the electrically-operable motor moves the cam follower to cause the pin to travel along the groove to adjust orientation of the mirror head;
   wherein, with the mirror head in the mirror mode orientation, and responsive to an input to adjust the mirror head to the display mode orientation, a first voltage is applied to cause the electrically-operable motor to adjust the mirror head out of the mirror mode orientation;
   wherein, with the mirror head adjusted out of the mirror mode orientation, a second voltage is applied to cause the electrically-operable motor to adjust the mirror head toward the display mode orientation;
   wherein, after the mirror head is adjusted toward the display mode orientation, a third voltage is applied to cause the electrically-operable motor to adjust the mirror head into the display mode orientation; and
   wherein the second voltage is a lower voltage than the first voltage, and wherein the second voltage is a lower voltage than the third voltage.

2. The vehicular interior rearview mirror assembly of claim 1, wherein, when the second voltage is applied to cause the electrically-operable motor to adjust the mirror head toward the display mode orientation, the orientation of the mirror head adjusts toward the display mode orientation at less than 10 degrees per second.

3. The vehicular interior rearview mirror assembly of claim 1, wherein the actuator comprises a housing that houses the electrically-operable motor.

4. The vehicular interior rearview mirror assembly of claim 1, wherein, responsive to the input to adjust the mirror head to the display mode orientation, the video display screen displays video images before the mirror head is adjusted out of the mirror mode orientation.

5. The vehicular interior rearview mirror assembly of claim 1, wherein, with the vehicular interior rearview mirror assembly attached at the interior portion of the vehicle and when the mirror head is in the display mode orientation, the reflective element is angled one of (i) upward relative to an orientation of the reflective element when in the mirror mode orientation and (ii) downward relative to an orientation of the reflective element when in the mirror mode orientation.

6. The vehicular interior rearview mirror assembly of claim 1, wherein the mirror head is pivotally mounted at a mirror mount via a pivot joint, and wherein the mirror mount is configured to attach at the interior portion of the vehicle, and wherein the pivot joint comprises a first pivot element at the mirror mount and a second pivot element at the actuator.

7. The vehicular interior rearview mirror assembly of claim 6, wherein, with the mirror mount attached at the interior portion of the vehicle, the actuator, when the electrically-operable motor is operated, adjusts the orientation of the mirror head one of (i) upward relative to the second pivot element and (ii) downward relative to the second pivot element.

8. The vehicular interior rearview mirror assembly of claim 7, wherein the actuator comprises a housing that houses the electrically-operable motor, and wherein the second pivot element is part of the housing.

9. The vehicular interior rearview mirror assembly of claim 8, wherein the housing is pivotable relative to a base portion of the actuator, and wherein the base portion is attached at the rear of the display device, and wherein the pin is disposed at the base portion, and wherein operation of the electrically-operable motor of the actuator pivots the housing relative to the base portion to pivot the display device and the reflective element relative to the second pivot element.

10. The vehicular interior rearview mirror assembly of claim 1, wherein the groove of the cam follower comprises a curved groove having opposite end regions and a middle region between the opposite end regions.

11. The vehicular interior rearview mirror assembly of claim 10, wherein the middle region of the groove comprises a non-uniform radius of curvature, and wherein each end region of the groove comprises a constant radius of curvature.

12. The vehicular interior rearview mirror assembly of claim 11, wherein the first voltage is applied to cause the electrically-operable motor to move the cam follower to cause the pin to travel along one end region of the groove, and wherein the second voltage is applied to cause the electrically-operable motor to move the cam follower to cause the pin to travel along the middle region of the groove, and wherein the third voltage is applied to cause the electrically-operable motor to move the cam follower to cause the pin to travel along the other end region of the groove.

13. The vehicular interior rearview mirror assembly of claim 11, wherein the groove of the cam follower comprises an Archimedean spiral form.

14. The vehicular interior rearview mirror assembly of claim 1, wherein the actuator comprises a biasing element that urges the mirror head toward the display mode orientation.

15. The vehicular interior rearview mirror assembly of claim 1, wherein the reflective element has a length dimension and a width dimension, and wherein the video display screen has a length dimension and a width dimension, and wherein the length dimension of the video display screen spans at least 75 percent of the length dimension of the reflective element, and wherein the width dimension of the video display screen spans at least 75 percent of the width dimension of the reflective element.

16. The vehicular interior rearview mirror assembly of claim 1, wherein the reflective element has a length dimension and a width dimension, and wherein the video display screen has a length dimension and a width dimension, and wherein the length dimension of the video display screen spans at least 95 percent of the length dimension of the reflective element, and wherein the width dimension of the video display screen spans at least 95 percent of the width dimension of the reflective element.

17. The vehicular interior rearview mirror assembly of claim 1, wherein the actuator comprises a stop element that mechanically stops adjustment of the mirror head before the pin reaches an end of the groove.

18. The vehicular interior rearview mirror assembly of claim 1, wherein the actuator comprises a pair of cam followers that have respective grooves that receive respective pins disposed at the mirror head, and wherein operation of the electrically-operable motor moves the pair of cam followers to cause the respective pins to travel along the respective grooves to adjust orientation of the mirror head.

19. The vehicular interior rearview mirror assembly of claim 1, wherein the reflective element comprises an electrochromic reflective element having a front glass substrate and a rear glass substrate with an electrochromic medium disposed between the front glass substrate and the rear glass substrate, and wherein the glass substrate having the transflective mirror reflector coated at the surface thereof comprises the rear glass substrate.

20. The vehicular interior rearview mirror assembly of claim 1, wherein the reflective element comprises a prismatic reflective element, and wherein the glass substrate having the transflective mirror reflector coated at the surface thereof comprises a wedge-shaped glass substrate.

21. A vehicular interior rearview mirror assembly, the vehicular interior rearview mirror assembly comprising:

a mirror head having an electrochromic reflective element;

wherein the electrochromic reflective element comprises a front glass substrate and a rear glass substrate with an electrochromic medium disposed between the front glass substrate and the rear glass substrate, and wherein the rear glass substrate has a transflective mirror reflector coated at a surface thereof, and wherein the transflective mirror reflector is partially reflective of visible light incident thereat and partially transmissive of visible light;

a display device disposed in the mirror head and behind the electrochromic reflective element, wherein the display device comprises a video display screen that is operable to display video images that are viewable through the transflective mirror reflector of the electrochromic reflective element;

wherein, with the vehicular interior rearview mirror assembly attached at an interior portion of a vehicle, the mirror head is adjustable between (i) a mirror mode orientation, in which the video display screen is not displaying video images and a driver of the vehicle views rearward of the vehicle using the transflective mirror reflector of the electrochromic reflective element, and (ii) a display mode orientation, in which the video display screen is displaying video images viewable by the driver of the vehicle through the transflective mirror reflector of the electrochromic reflective element;

wherein, with the vehicular interior rearview mirror assembly attached at the interior portion of the vehicle and when the mirror head is in the display mode orientation, the electrochromic reflective element is angled one of (i) upward relative to an orientation of the electrochromic reflective element when in the mirror mode orientation and (ii) downward relative to an orientation of the electrochromic reflective element when in the mirror mode orientation;

wherein, with the vehicular interior rearview mirror assembly attached at the interior portion of the vehicle, and with the mirror head is in the display mode orientation, the video display screen displays video images derived from video image data captured by a camera of the vehicle viewing exterior the vehicle;

an actuator, wherein the actuator comprises an electrically-operable motor that, when operated, moves a cam follower of the actuator;

wherein the cam follower of the actuator has a groove that is traveled along by a pin disposed at the mirror head, and wherein operation of the electrically-operable motor moves the cam follower to cause the pin to travel along the groove to adjust orientation of the mirror head;

wherein, with the mirror head in the mirror mode orientation, and responsive to an input to adjust the mirror head to the display mode orientation, a first voltage is applied to cause the electrically-operable motor to adjust the mirror head out of the mirror mode orientation;

wherein, with the mirror head adjusted out of the mirror mode orientation, a second voltage is applied to cause the electrically-operable motor to adjust the mirror head toward the display mode orientation;

wherein, after the mirror head is adjusted toward the display mode orientation, a third voltage is applied to cause the electrically-operable motor to adjust the mirror head into the display mode orientation; and wherein the second voltage is a lower voltage than the first voltage, and wherein the second voltage is a lower voltage than the third voltage.

22. The vehicular interior rearview mirror assembly of claim 21, wherein, when the second voltage is applied to cause the electrically-operable motor to adjust the mirror head toward the display mode orientation, the orientation of the mirror head adjusts toward the display mode orientation at less than 10 degrees per second.

23. The vehicular interior rearview mirror assembly of claim 21, wherein, responsive to an input to adjust the mirror head to the display mode orientation, the video display screen displays video images before the mirror head is adjusted out of the mirror mode orientation.

24. The vehicular interior rearview mirror assembly of claim 21, wherein the actuator comprises a biasing element that urges the mirror head toward the display mode orientation.

25. The vehicular interior rearview mirror assembly of claim 21, wherein the electrochromic reflective element has a length dimension and a width dimension, and wherein the video display screen has a length dimension and a width dimension, and wherein the length dimension of the video display screen spans at least 75 percent of the length dimension of the electrochromic reflective element, and wherein the width dimension of the video display screen spans at least 75 percent of the width dimension of the electrochromic reflective element.

26. The vehicular interior rearview mirror assembly of claim 21, wherein the electrochromic reflective element has a length dimension and a width dimension, and wherein the video display screen has a length dimension and a width dimension, and wherein the length dimension of the video display screen spans at least 95 percent of the length dimension of the electrochromic reflective element, and wherein the width dimension of the video display screen spans at least 95 percent of the width dimension of the electrochromic reflective element.

27. The vehicular interior rearview mirror assembly of claim 21, wherein the actuator comprises a stop element that mechanically stops adjustment of the mirror head before the pin reaches an end of the groove.

28. A vehicular interior rearview mirror assembly, the vehicular interior rearview mirror assembly comprising:

a mirror head having a reflective element;

wherein the reflective element comprises a glass substrate having a transflective mirror reflector coated at a surface thereof, and wherein the transflective mirror reflector is partially reflective of visible light incident thereat and partially transmissive of visible light;

a display device disposed in the mirror head and behind the reflective element, wherein the display device comprises a video display screen that is operable to display video images that are viewable through the transflective mirror reflector of the reflective element;

wherein, with the vehicular interior rearview mirror assembly attached at an interior portion of a vehicle, the mirror head is adjustable between (i) a mirror mode orientation, in which the video display screen is not displaying video images and a driver of the vehicle views rearward of the vehicle using the transflective mirror reflector of the reflective element, and (ii) a display mode orientation, in which the video display screen is displaying video images viewable by the driver of the vehicle through the transflective mirror reflector of the reflective element;

wherein, with the vehicular interior rearview mirror assembly attached at the interior portion of the vehicle, and with the mirror head is in the display mode orientation, the video display screen displays video images derived from video image data captured by a camera of the vehicle viewing exterior the vehicle;

an actuator, wherein the actuator comprises an electrically-operable motor that, when operated, moves a cam follower of the actuator;

wherein the cam follower of the actuator has a groove that is traveled along by a pin disposed at the mirror head, and wherein operation of the electrically-operable motor moves the cam follower to cause the pin to travel along the groove to adjust orientation of the mirror head;

wherein the groove of the cam follower comprises a curved groove having a first end region, a second end region and a middle region between the first end region and the second end region;

wherein, with the mirror head in the mirror mode orientation, and responsive to an input to adjust the mirror head to the display mode orientation, a first voltage is applied to cause the electrically-operable motor to cause the pin to travel along the first end region of the groove to adjust the mirror head out of the mirror mode orientation;

wherein, with the mirror head adjusted out of the mirror mode orientation, a second voltage is applied to cause the electrically-operable motor to cause the pin to travel along the middle region of the groove to adjust the mirror head toward the display mode orientation;

wherein the video display screen displays video images while the mirror head is adjusting toward the display mode orientation;

wherein, after the mirror head is adjusted toward the display mode orientation, a third voltage is applied to cause the electrically-operable motor to cause the pin to travel along the second end region of the groove to adjust the mirror head into the display mode orientation; and wherein the second voltage is a lower voltage than the first voltage, and wherein the second voltage is a lower voltage than the third voltage.

29. The vehicular interior rearview mirror assembly of claim 28, wherein, with the vehicular interior rearview mirror assembly attached at the interior portion of the vehicle and when the mirror head is in the display mode orientation, the reflective element is angled one of (i) upward relative to an orientation of the reflective element when in the mirror mode orientation and (ii) downward relative to an orientation of the reflective element when in the mirror mode orientation.

30. The vehicular interior rearview mirror assembly of claim 28, wherein the middle region of the groove comprises a non-uniform radius of curvature, and wherein each of the first end region of the groove and the second end region of the groove comprises a uniform radius of curvature.

31. The vehicular interior rearview mirror assembly of claim 28, wherein the actuator comprises a biasing element that urges the mirror head toward the display mode orientation.

32. The vehicular interior rearview mirror assembly of claim 28, wherein the reflective element has a length dimension and a width dimension, and wherein the video display screen has a length dimension and a width dimension, and wherein the length dimension of the video display screen spans at least 75 percent of the length dimension of the reflective element, and wherein the width dimension of the video display screen spans at least 75 percent of the width dimension of the reflective element.

33. The vehicular interior rearview mirror assembly of claim 28, wherein the reflective element has a length dimension and a width dimension, and wherein the video display screen has a length dimension and a width dimension, and wherein the length dimension of the video display screen spans at least 95 percent of the length dimension of the reflective element, and wherein the width dimension of the video display screen spans at least 95 percent of the width dimension of the reflective element.

34. The vehicular interior rearview mirror assembly of claim 28, wherein the curved groove terminates at the first end region at a first terminal end and at the second end region at a second terminal end, and wherein the actuator comprises a stop element that mechanically stops adjustment of the mirror head before the pin reaches the first terminal end or the second terminal end.

35. The vehicular interior rearview mirror assembly of claim 28, wherein the reflective element comprises an electrochromic reflective element having a front glass substrate and a rear glass substrate with an electrochromic medium disposed between the front glass substrate and the rear glass substrate, and wherein the glass substrate having the transflective mirror reflector coated at the surface thereof comprises the rear glass substrate.

36. The vehicular interior rearview mirror assembly of claim 28, wherein the reflective element comprises a prismatic reflective element, and wherein the glass substrate having the transflective mirror reflector coated at the surface thereof comprises a wedge-shaped glass substrate.

* * * * *